United States Patent
Wang et al.

(10) Patent No.: US 12,053,931 B1
(45) Date of Patent: Aug. 6, 2024

(54) METHOD, DEVICE, AND ELECTRONIC DEVICE FOR CONTROLLING 3D PRINTING

(71) Applicant: Hangzhou Regenovo Bio-technology Co., Ltd., Hangzhou (CN)

(72) Inventors: Ling Wang, Hangzhou (CN); Shanshan Yang, Hangzhou (CN); Mingen Xu, Hangzhou (CN); Gongle Huang, Hangzhou (CN)

(73) Assignee: Hangzhou Regenovo Bio-technology Co., Ltd., Hangzhou (CN)

( * ) Notice: Subject to any disclaimer, the term of this patent is extended or adjusted under 35 U.S.C. 154(b) by 0 days.

(21) Appl. No.: 18/588,042

(22) Filed: Feb. 27, 2024

Related U.S. Application Data

(63) Continuation of application No. PCT/CN2022/084590, filed on Mar. 31, 2022.

(30) Foreign Application Priority Data

Jan. 14, 2022 (CN) .......................... 202210044118.9

(51) Int. Cl.
*B29C 64/393* (2017.01)
*B29C 64/118* (2017.01)
(Continued)

(52) U.S. Cl.
CPC .......... *B29C 64/393* (2017.08); *B29C 64/118* (2017.08); *B33Y 30/00* (2014.12); *B33Y 50/02* (2014.12)

(58) Field of Classification Search
CPC ..... B29C 64/393; B29C 64/20; B29C 64/118; B29C 64/10; B29C 64/171; B29C 64/147;
(Continued)

(56) References Cited

U.S. PATENT DOCUMENTS

| 2005/0131662 A1 | 6/2005 | Ascenzi et al. |
| 2019/0039298 A1 | 2/2019 | Barnes et al. |

(Continued)

FOREIGN PATENT DOCUMENTS

| CN | 104605881 A | 5/2015 |
| CN | 104943176 A | 9/2015 |

(Continued)

OTHER PUBLICATIONS

Internation Search Report of PCT/CN2022/084590, Mailed Sep. 28, 2022.
(Continued)

*Primary Examiner* — Stella K Yi

(57) ABSTRACT

The present disclosure provides a method, device, and electronic device for controlling 3D printing. The method comprises: controlling a 3D printing device to print based on the preset printing parameters by a preset printing control strategy to obtain printing results; monitoring the printing environment, printing structure, and the printing results by a monitor to obtain the corresponding monitoring information; adjusting the preset printing parameters based on the monitoring information by a printing feedback control strategy to obtain adjusted results of the printing parameters; time-programing the printing results to position printing based on the monitoring information using a spatiotemporal recombination control strategy to obtain printing results of spatiotemporal positioning control.

8 Claims, 22 Drawing Sheets

(51) Int. Cl.
 *B33Y 30/00* (2015.01)
 *B33Y 50/02* (2015.01)
(58) Field of Classification Search
 CPC ..... B29C 64/386; B29C 64/279; B29C 64/30; B29C 2037/90; B29C 39/44; B29C 41/52; B29C 45/76; B29C 2045/7606; B33Y 50/02; B33Y 30/00
 See application file for complete search history.

(56) References Cited

U.S. PATENT DOCUMENTS

| | | |
|---|---|---|
| 2019/0337232 A1 | 11/2019 | Prabha Narra et al. |
| 2019/0339671 A1 | 11/2019 | Yona et al. |
| 2020/0023586 A1 | 1/2020 | Shin et al. |
| 2020/0262154 A1 | 8/2020 | MacNeish, III et al. |
| 2021/0060863 A1 | 3/2021 | Rudolph et al. |

FOREIGN PATENT DOCUMENTS

| | | |
|---|---|---|
| CN | 105082533 A | 11/2015 |
| CN | 105479751 A | 4/2016 |
| CN | 105534543 A | 5/2016 |
| CN | 106457668 A | 2/2017 |
| CN | 107159886 A | 9/2017 |
| CN | 107498874 A | 12/2017 |
| CN | 107839240 A | 3/2018 |
| CN | 108481749 A | 9/2018 |
| CN | 110052607 A | 7/2019 |
| CN | 110411308 A | 11/2019 |
| CN | 110605854 A | 12/2019 |
| CN | 111113886 A | 5/2020 |
| CN | 111251614 A | 6/2020 |
| CN | 111347666 A | 6/2020 |
| CN | 111491780 A | 8/2020 |
| CN | 112895462 A | 6/2021 |
| CN | 113910596 A | 1/2022 |
| JP | 2018027558 A | 2/2018 |
| WO | 2018211010 A1 | 11/2018 |
| WO | 2020234312 A1 | 11/2020 |

OTHER PUBLICATIONS

Frank J.Rybicki et al., 3D Printing in Medicine: A Practical Guide for Medical Professionals, Shanghai Century Publishing (Group) Co., Ltd; Shanghai Scientific & Technical Publishers, Apr. 30, 2021, p. 104.

Zhang Yujin, Image Engineering (vol. 2)—Image Understanding and Computer Vision, Tsinghua University Press, Aug. 31, 2000, pp. 168-169.

Gao Xiaosong et al., Edge Extraction Method of CT Image with Lattice Structure Based on Shape Prior, New Technology & New Process, No. 11, Nov. 25, 2019, pp. 60-65.

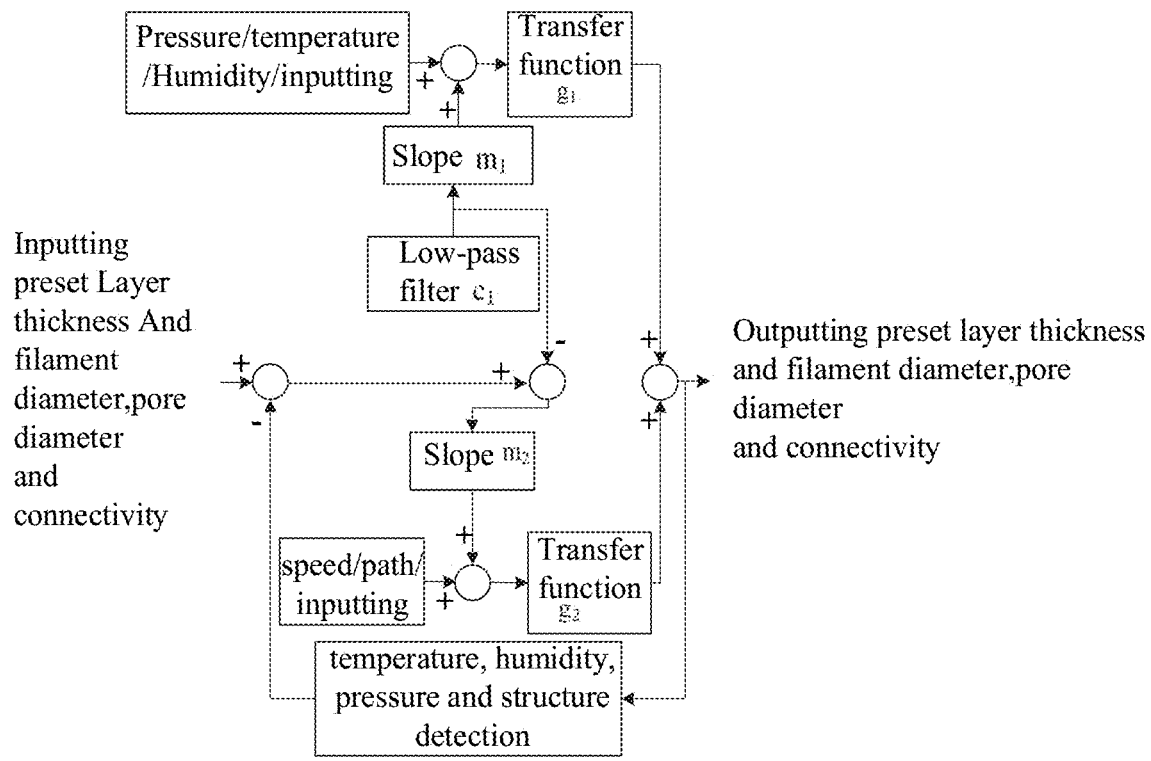
FIG. 2
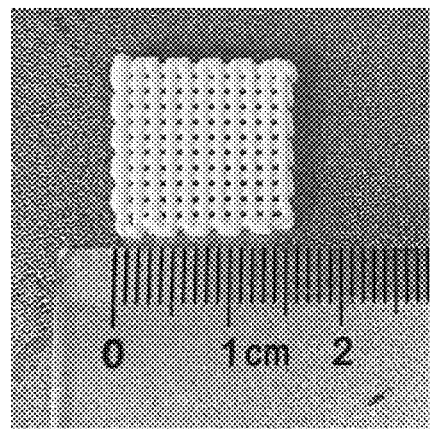
FIG. 3A1

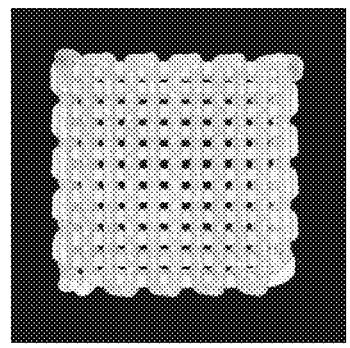
FIG. 3A2
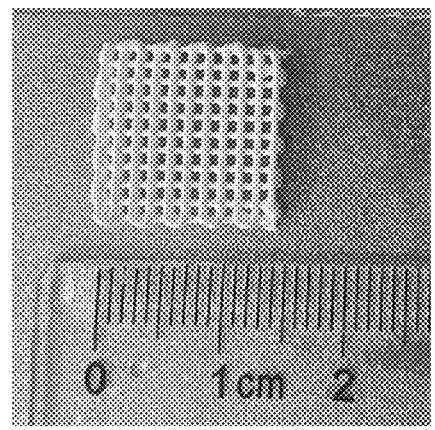
FIG. 3B1
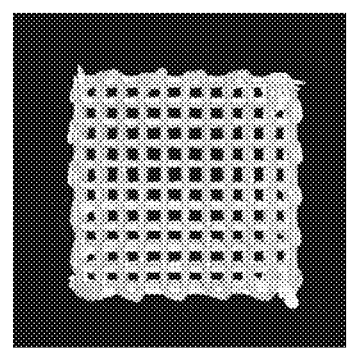
FIG. 3B2

METHOD, DEVICE, AND ELECTRONIC DEVICE FOR CONTROLLING 3D PRINTING

CROSS-REFERENCE TO RELATED APPLICATIONS

This application is a continuation of International Patent Application No. PCT/CN2022/084590 with a filing date of Mar. 31, 2022, designating the United States, now pending, and further claims priority to Chinese Patent Application No. 202210044118.9 with a filing date of Jan. 14, 2022. The content of the aforementioned applications, including any intervening amendments thereto, are incorporated herein by reference.

FIELD

The present disclosure belongs to the field of additive manufacturing, particularly to a method, device, and electronic device for controlling 3D printing.

BACKGROUND

Currently, 3D printing (three-dimensional printing) is widely used in various fields, and its printing accuracy is crucial. For example, in 3D bioprinting tissue engineering scaffolds, the size of specific pore sizes will affect cell growth directly, and porous structures are advantageous for cell generation and metabolic waste transportation, so getting a high-fidelity structure consistent with the design model is important. However, the instability of rheological properties of the materials, the motion errors of three axis and the printing environment parameter variation during the 3D bioprinting can all result in the internal spatial structure and microstructure of the 3D printing scaffold to be inconsistent with the preset, and corresponding geometric structural errors can seriously affect mechanical and biological performance.

Therefore, the existing 3D printing technologies has low printing accuracy.

SUMMARY

The purpose of the present disclosure is to provide a method, device, and electronic device for controlling 3D printing, which will improve low 3D printing accuracy in existing technology.

In a first aspect, the present disclosure provides a method for controlling 3D printing, comprising:
  obtaining preset printing parameters, and controlling a 3D printing device to obtain printing results based on the preset printing parameters by a preset printing control strategy;
  monitoring a printing environment, printing structure, and the printing results by a monitoring device to obtain corresponding monitoring information results of the printing environment, the printing structure, and the printing results;
  adjusting the preset printing parameters based on the monitoring information by a printing feedback control strategy to obtain adjusted results of the printing parameters;
  time-programing the printing results to achieve temporally programmed and spatially reorganized printing based on the monitoring information through a spatiotemporal recombination control strategy to obtain printing results of spatiotemporal positioning control.

In one embodiment, prior to the step of obtaining preset printing parameters, and controlling a 3D printing device to perform printing based on the preset printing parameters through a preset printing control strategy, and obtaining the printing result, the method further comprises:
  obtaining multiple data to be printed and conducting print testing on each of them using preset test functions to obtain multiple test results:
  establishing a printing parameter library based on the multiple data to be printed and the corresponding multiple test results; performing a deep learning training on the printing parameter library to obtain the preset printing control strategy; wherein, the preset printing control strategy is used for adjusting printing parameters in the printing feedback control strategy and the spatiotemporal recombination control strategy.

In one embodiment, the monitoring device comprises an environmental monitoring equipment and 3D imaging equipment; monitoring the printing environment, printing structure, and printing results by a monitoring equipment to obtain a monitoring information corresponding to the printing environment, printing structure, and printing results comprises:
  monitoring the printing environment by the environmental monitor to obtain an environmental monitoring information corresponding to the printing environment;
  monitoring the printing structure and the printing results by the 3D imaging equipment to obtain the 3D imaging structure monitoring information corresponding to the printing process and the printing results;
  obtaining the corresponding monitoring information related to the printing process environment, printing structure, and printing results based on the environmental monitoring information and the 3D imaging structure monitoring information.

In one embodiment, the steps for obtaining printing parameter adjustment results through feedback control strategy on the predetermined printing parameters based on the monitoring information during the printing process include:
  performing a first information processing operation on the monitoring information to obtain an imaging field size corresponding to the monitoring information;
  comparing the imaging field size with the predetermined lateral dimension yields the first comparative result.
  comparing the imaging field size with the preset lateral size to yield the first comparative result;
  making a first adjustment to the preset printing parameters based on the aforementioned first comparative result.

In one embodiment, the steps for obtaining the results of adjusting the preset printing parameters through a feedback control strategy during the printing process based on the monitoring information include:
  performing a second information processing operation on the monitoring information to obtain an effective penetration depth corresponding to the monitoring information; comparing the effective penetration depth with the preset longitudinal size to obtain the second comparative result;
  making a second adjustment to the preset printing parameters based on the aforementioned second comparative result.

In one embodiment, the steps for obtaining the printing parameter adjustment results through feedback control strategy on the preset printing parameters based on the monitoring information during the printing process include:

performing a third information processing operation on the monitoring information to obtain quantitative analysis results corresponding to the monitoring information;

comparing the quantitative analysis results with the preset threshold to obtain a third comparison result;

making a third adjustment to the preset printing parameters based on the third comparative result.

In one embodiment, the printing results can be time-programed to position printing based on the monitoring information using a spatiotemporal recombination control strategy to obtain the spatiotemporal positioning control printing results. The steps include:

obtaining spatiotemporal recombination and regulatory instructions for the monitoring information; controlling the 3D printing device to perform time-programmed positioning printing at the target position based on the spatiotemporal recombination control instruction, then obtaining the time-programed positioning printing result;

the spatiotemporal recombination control instructions include the target position, printing start time, printing materials selection, and printing parameter settings. In one embodiment, the preset test function may include any one or more of multiple of the following options:

transfer function for linear-path control, transfer function for start-stop point control, and transfer function for corner control.

Secondly, a device for controlling 3D printing is provided, comprising: an acquisition module, used for obtaining preset printing parameters, controlling the 3D printing device for print based on the preset printing parameters through a preset printing control strategy to obtain printing results;

a monitoring module, used for monitoring the printing process environment, printing structure, and printing results by a monitoring device to obtain monitoring information corresponding to the printing process environment, printing structure, and printing results; an adjustment module, used for adjusting the preset printing parameters based on the monitoring information by a printing feedback control strategy to obtain the printing parameter adjustment results; a positioning module, used for time-space programming and positioning the printing results using a spatiotemporal recombination control strategy based on the monitoring information to obtain printing results of spatiotemporal positioning control.

Thirdly, the present disclosure embodiments further provide an electronic device comprising a memory and a processor, wherein the memory stores a computer program which is executed on the processor, and the processor executes the steps of implementing the method described in the first aspect.

The present disclosure has brought about the following beneficial effects:

the present disclosure relates to a method, device, and electronic device for controlling 3D printing. Firstly, the preset printing parameters are obtained, and the 3D printing device is controlled based on the preset printing parameters to print through a preset printing control strategy to obtain printing results. Then, the printing results are monitored by the monitor device to obtain the monitoring information corresponding to the printing results. The preset printing parameters are adjusted based on the monitoring information by the printing feedback control strategy to obtain the adjusted results of the printing parameters, and the overall structural information of the adjusted results is obtained synchronously.

A secondary spatiotemporal recombination and positioning printing can also be performed based on the overall structural information, according to the functional regeneration requirements of the printing model. In this scheme, a pre-constructed printing system control strategy is first proposed based on the framework of material printing result rather than printing machinery. Due to the flexible and variable mechanical characteristics of the printing materials, the accuracy of the printing machinery itself cannot determine the accuracy of the printing results. Pre-constructing a system control strategy from the material printing structure can better reflect the precise matching of the printing materials and the printing systems, and can more accurately determine the system control scheme to improve printing accuracy and fidelity.

Then, the real-time monitoring of the printing results is performed by a monitor (such as environmental monitor and 3D imaging device).

The printing feedback control of the printing process considers the environmental parameters and process structure information together, which enables efficient adjustment of the printing parameters in time based on the monitored printing structure, thereby ensuring the accuracy of the printing results and improving low 3D printing accuracy in existing technologies. An image-guided spatiotemporal structure restructuring and control strategy is proposed, where the 3D printing nozzle can accurately program and locate the printed tissue model, achieving precise positioning and regulation of the tissue model regeneration process, and providing a new method for orderly regulating the tissue model regeneration.

BRIEF DESCRIPTION OF THE DRAWINGS

In order to provide a clearer illustration of the specific implementation methods or technical solutions in this application, a brief introduction will be given below to the accompanying drawings required in the description of the specific implementation methods or existing technologies. It is evident that the accompanying drawings in the following description are some of the implementation methods of the present disclosure. For those ordinary skilled persons in the field, other additional drawings can also be obtained based on these drawings without exerting creative labor.

FIG. 2 is a block diagram of a multi-input multi-output iterative learning control provided in the embodiments of the present disclosure of the present disclosure;

FIG. 3A1 is a photo of a scaffold;

FIG. 3A2 is a 3D imaging reconstruction result graph corresponding to the photo of FIG. 3A1;

FIG. 3B1 is a photo of another scaffold;

FIG. 3B2 is a 3D imaging reconstruction result graph corresponding to the photo of FIG. 3B1;

DETAILED DESCRIPTION OF EMBODIMENTS

In order to clarify the purpose, technical solution, and advantages of the embodiments of the present disclosure, a clear and complete description of the technical solution of the present disclosure will be provided below in conjunction with the accompanying drawings. Obviously, the described embodiments are one part of the embodiments of the present disclosure, rather than all of them. Based on the embodiments disclosed in the present disclosure, all other embodiments obtained by the skilled in the art without creative labor fall within the scope of protection of the present disclosure.

The terms "including" and "having" described in the embodiments of the present disclosure, as well as any variations thereof, are intended to cover non-exclusive inclusions. For example, a process, method, system, product, or device that comprises a series of steps or units is not limited to the listed steps or units, but may optionally include other steps or units that are not listed, or may optionally include other steps or units inherent to these processes, methods, products, or devices. In tissue engineering scaffolds, the size of specific pore directly affects cell growth. Porous structures are advantageous for cell generation and the transportation of metabolic waste, achieving a structure with high fidelity consistent with the design model is crucial. However, the unstable rheological properties of materials in the biological 3D printing and triaxial motion errors during printing can result in the internal spatial structure and microstructure of the 3D printing scaffold to be inconsistent with the preset values. Geometric structural errors can seriously affect mechanical and biological performance. Therefore, in order to improve the accuracy and fidelity of 3D printing, three urgent issues need to be addressed: establishing control strategies for printing systems based on the rheological properties of different materials accurately; implementing the online detection or sensing devices for printing process parameters and structure to monitor the environmental parameters and the 3D structure during printing as feedback control basis; and quantitatively defining printing fidelity and establishing feedback control strategies to improve printing accuracy and fidelity based on printing fidelity requirements and sensor detection.

From the aforementioned shortcomings, it can be inferred that there are technological issues regarding low precision in current 3D printing techniques.

Thus, the embodiments of the present disclosure provide a method, device, and electronic device for controlling 3D printing, which can improve low 3D printing accuracy in the existing technology. The following will further describe the embodiments of the present disclosure in conjunction with the accompanying drawings.

Figure 1:
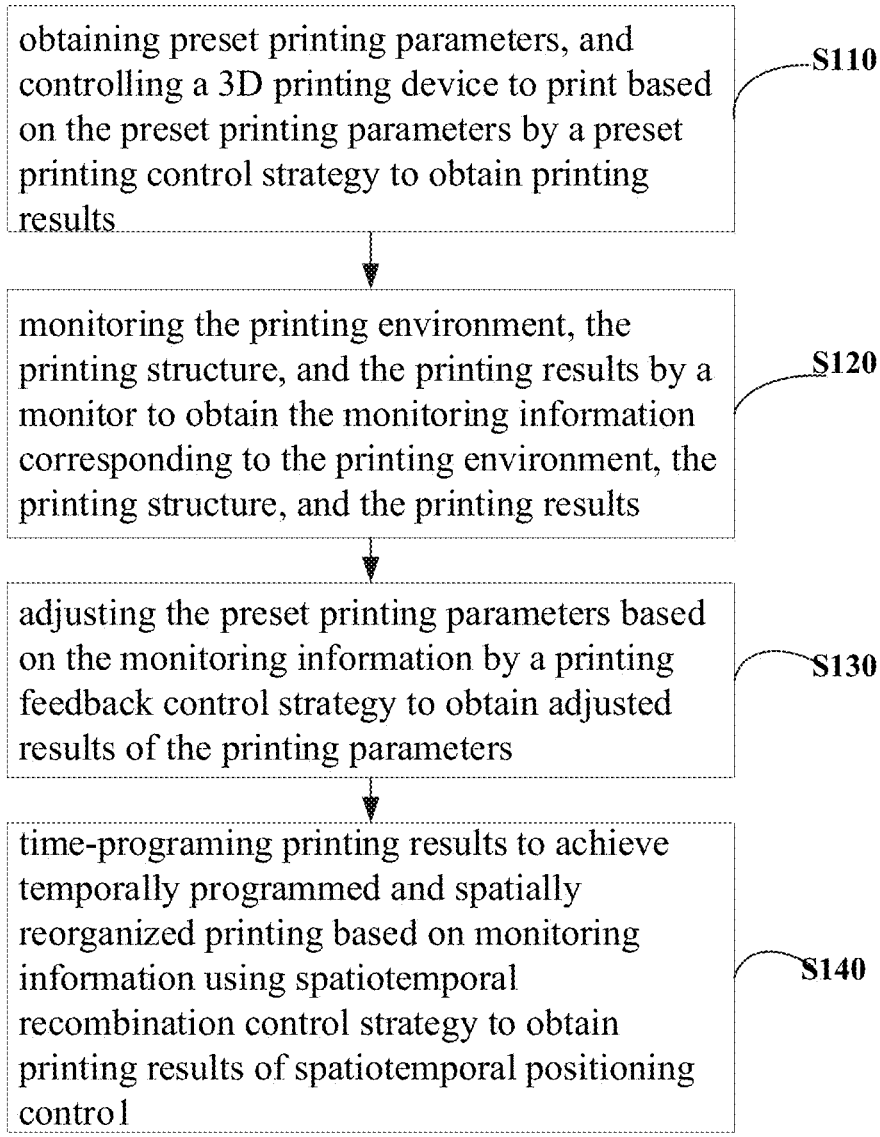
FIG. 1 is a flowchart of a method for controlling 3D printing provided in one embodiment of the present disclosure.

FIG. 1 is a flowchart of a method for controlling 3D printing provided in one embodiment of the present disclosure. As shown in FIG. 1, the method comprises:

Step S110, obtaining preset printing parameters, and controlling a 3D printing device to print based on the preset printing parameters by a preset printing control strategy to obtain printing results.

For example, the preset printing control strategy is a control transfer function established based on rheological properties of the printing materials and the actual measurements of the printed filament, which is the control transfer function of the filament diameter, the layer thickness, and printing system control parameters of a printing system (printing nozzle control pressure, control delay, platform movement speed, nozzle temperature, etc.), which may include but are not limited to any one or more of: a linear-path control transfer function, a start-stop control transfer function, and a turnaround control transfer function. Due to the flexible and variable mechanical characteristics of the printing materials, the accuracy of the printing machine itself cannot determine the accuracy of the printing results. Pre-constructing a system control strategy based on the material printing structure can better reflect the precise matching of the printing materials and the printing systems, and more accurately determine the system control scheme to improve printing accuracy and fidelity.

The quantification of the filament diameter and the layer thickness is achieved by obtaining 3D structural image data of individual filament layers by a 3D imaging device, and then the quantitative calculation is performed based on the image data. The resolution of the 3D imaging device should be higher than twice the minimum filament diameter (printing resolution) of the printing device, with a recommended value of at least 10 times higher. The penetration depth of the imaging device should be greater than the minimum thread layer thickness of the printing device, in order to accurately quantify the filament diameter and the layer thickness, in order to establish an accurate material printing control transfer function. The 3D imaging device including Micro Computed Tomography (Micro-CT), 3D ultrasound, Magnetic Resonance Imaging (MRI), Laser Confocal Scanning, Multi-Photon Microscopy (MPM), Optical Coherence Tomography (OCT) or Printing-aid Optical Coherence Tomography (P-OCT). The choice of instrument depends on experimental conditions and printing resolution of the printing device. In practical application, the system can first obtain the parameters required for printing, such as preset layer thickness, filament diameter, aperture, pore connectivity rate, etc. Then, the 3D printing device can be controlled based on these parameters by preset printing control strategies to obtain printing results.

Step S120, monitoring information corresponding to the printing process environment, printing structure, and the printing results is obtained by monitoring devices.

For example, the monitor can use distributed sensing to monitor the environmental parameters of printing, including the temperature of each independent nozzle (material storage area, flow area, jetting area), molding environment temperature, molding platform temperature, molding environment humidity, air pressure controlled by the printing nozzle, three-axis movement speed of the motion platform, three-axis coordinates of the starting position, etc. The monitor can also use 3D imaging to monitor the structural changes during printing online. It is preferred to have an imaging device that can be integrated with the printing system and detect the 3D structure of the printing online. The imaging resolution of the imaging device should be higher than twice the minimum filament diameter (printing resolution) of the printing device, preferably more than 10 times. The penetration depth of the imaging device should be greater than the minimum thread layer thickness of the printing device, to accurately image and quantify the structure of the printing. By monitoring the printing results by a monitor, monitoring information corresponding to the printing results can be obtained, which facilitates the system to analyze and make further adjustments based on the monitoring information.

Step S130, adjusting the preset printing parameters based on monitoring information by a printing feedback control strategy to obtain adjusted results of the printing parameter.

For example, the feedback control strategy for the printing is based on the environmental parameters and 3D process structure information monitored during printing, and Multi-Input Multi-Output Iterative Learning Control (MIMO ILC) is performed to achieve a desired structure and structural fidelity. The probe for 3D imaging monitoring during printing can be installed parallel to the edge of the printing nozzle. The 3D imaging device is non-contact imaging device, preferably optical coherence tomography (OCT), laser scanning confocal microscopy (LSCM), photoacoustic imaging (PAI), and multiphoton microscopy (MPM), which can include but are not limited to different forms of OCT devices such as swept-source OCT, spectral domain OCT, time-domain OCT, full field time-domain OCT, and full field swept-source OCT, different forms of LSCM devices, PAI devices, and different forms of MPM devices such as two-photon and three-photon, or an integration of two of them. The OCT, LSCM, PAI, or MPM discrete tomographic imaging monitoring during the printing process is defined as Printing-Assisted Optical Coherence Tomography (P-OCT) for convenience. P-OCT utilizes the principle of 3D printing discrete stacking to perform 3D stitching and reconstruction of discrete OCT, LSCM, PAI, or MPM images obtained during printing, to obtain process the structural information and overall structural information of the manufacturing object for process feedback and overall quality evaluation. This enables the system to adjust preset printing parameters in time and perform spatiotemporal recombination and positioning printing after the overall completion.

Step S140, using a spatiotemporal recombination control strategy to perform temporal programming and positioning printing on the position printing based on the monitoring information, thus obtaining printing results of spatiotemporal positioning control.

In practical application, as shown in FIG. 2, the preset printing parameters are input into the 3D printing device, including preset layer thickness, filament diameter, aperture size, pore connectivity, and other printing structural parameters. The environmental parameters of printing and the structure of the printing are monitored by a monitor integrated with the printing device. The environmental parameters of printing include the temperature of each independent nozzle (material storage area, flow area, jetting area), molding environment temperature, molding platform temperature, molding environment humidity, air pressure controlled by the printing nozzle, three-axis movement speed of the motion platform, and three-axis coordinates of the starting position. The difference between preset input parameters and actual information obtained by monitoring in a 3D printing device is defined as an error, which is adjusted by a low-pass filter $c_1$ with rough adjustment and fine adjustment.

Figure 3C:
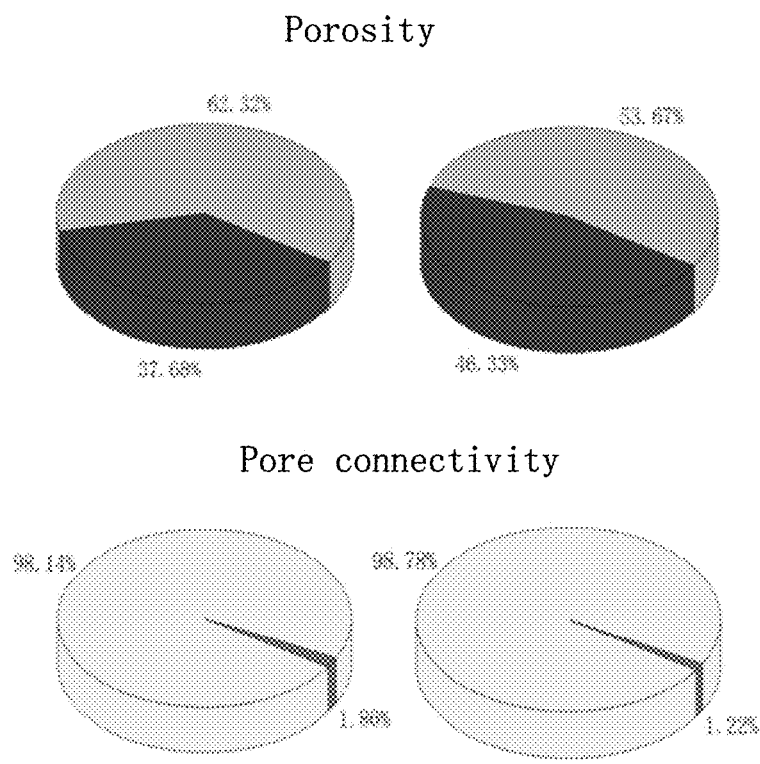
FIG. 3C is a calculation results graph of a porosity and a pore connectivity of a printed scaffold.
Figure 3D:
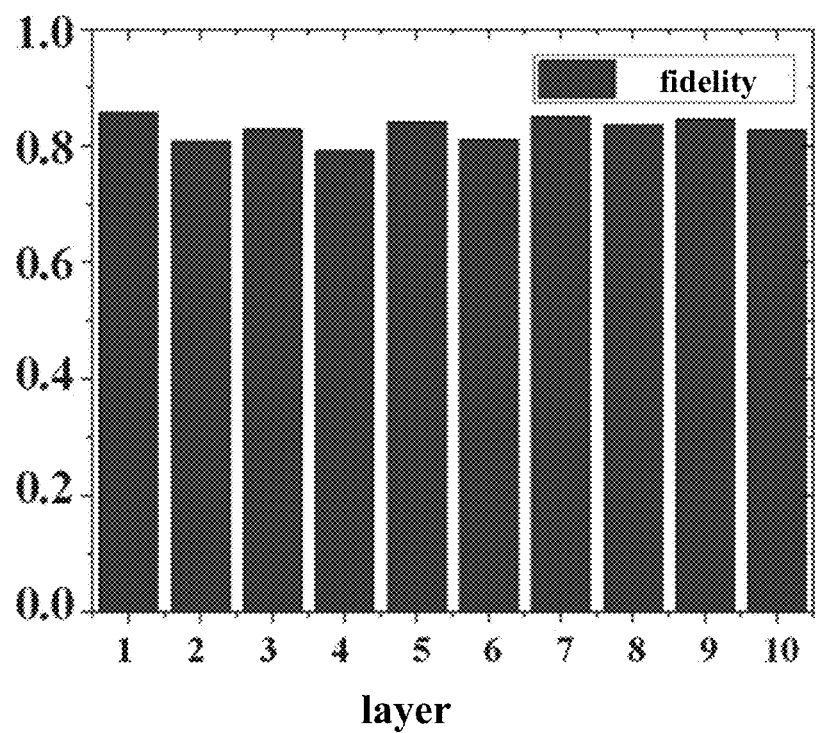
FIG. 3D is a calculation results graph of a fidelity of each layer of scaffolds before feedback.
Figure 3E:
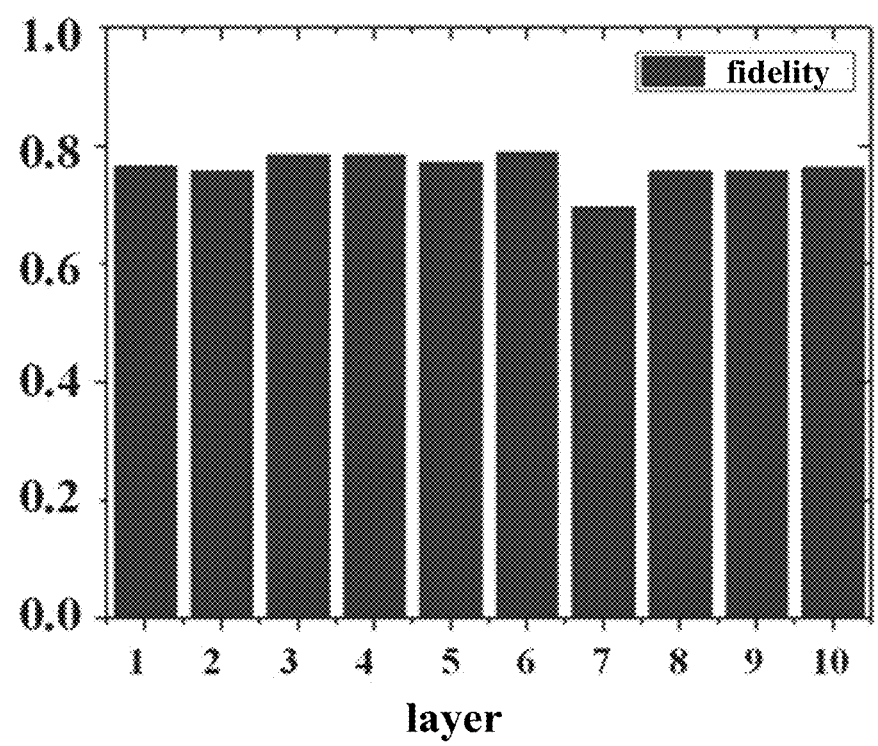
FIG. 3E is a calculation results graph of the fidelity of each layer of the scaffolds after feedback.

The adjustment of variables with significant hysteresis response in the printing structure to the changes in the printing environment is used as the rough adjustment of 3D printing. The slope of $m_1$ is the linear fitting slope of the filament size and the layer thickness with respect to this variable (such as air pressure). Treating the adjustment of variables with fast response in the printing structure as a fine-tuning component of 3D printing devices, that is, it is used as a real-time adjustment of parameters during printing, the slope $m_2$ is the linear fitting slope of the filament diameter and the layer thickness with respect to the step-input fast variable (such as speed). The transfer function $g_1$ and transfer function $g_2$ represents the response of the 3D printing device to tracking step-fast variables (such as speed) and slow variables (such as air pressure) inputs, respectively. These transfer functions characterize the closed-loop transfer function for both inputs. The results of two parameter adjustments are accumulated as the error compensation output of the 3D printing device. At the same time, the output results of the 3D imaging device integrated with the 3D printing device are input into the printing device to monitor the deviation between the feedback output structure and the preset value, thereby achieving iterative feedback control during printing. Finally, when the deviation between the printing model and the design model is considered acceptable, the iteration is stopped and the printing is completed. The comparison results using the 3D printing detection and control method of this scheme for high-precision and high-fidelity printing of the scaffold are shown in FIG. 3. The printing parameters of the non-feedback scaffold are set as follows: printing pressure of 0.26 MPa, printing speed of 9 mm/s, the printed photo of the scaffold and the 3D imaging reconstruction results are shown in FIG. 3A1 and A2, respectively. The printing parameters of the scaffold with feedback mechanism, which includes filament diameter and layer thickness feedback, are set as follows: printing pressure of 0.24 MPa, and the printing speed of 11 mm/s. The photo of the scaffold and the 3D imaging reconstruction results are shown in FIG. 3 B1 and B2, respectively.

After 3D imaging reconstruction, the overall size of the scaffold before feedback is measured as 15.469 mm (x)× 15.918 mm (y)×3.453 mm (z), while the overall size of the scaffold after feedback is measured as 15.102 mm (x)× 15.061 mm (y)×3.401 mm (z). The overall fidelity is calculated to be 84.67% and 93.07%, respectively. Based on this monitoring method, in-situ detection of the scaffold structural parameters for each layer can be achieved during printing, and feedback control can be achieved using a 3D imaging device. The calculation results of the fidelity of each layer of the two scaffolds before and after feedback are shown in FIGS. 3D and E, respectively. FIG. 3C shows that the calculation results of the porosity and pore connectivity of the printed scaffold before feedback are 37.68% and 98.14%, respectively. After feedback, the calculated porosity and connectivity of the scaffold are 46.32% and 98.78%, respectively.

In the embodiments of the present disclosure, a pre-constructed printing system control strategy is first proposed for printing based on the framework of material printing result rather than printing machinery. Due to the flexible and variable mechanical characteristics of the printing materials, the accuracy of the printing machinery itself cannot determine the accuracy of the printing results. Pre-constructing a system control strategy from the material printing structure can better reflect the precise matching of the printing materials and the printing systems, and can more accurately determine the system control scheme to improve printing accuracy and fidelity. Then, real-time monitoring of the printing process and results is performed by the monitor (such as environmental monitor and 3D imaging device). The environmental parameters and process structure information of the printing are considered together by the printing feedback control, so that the printing parameters can be adjusted efficiently and timely according to the printing monitoring structure, thereby ensuring the accuracy of the printing results and improving low 3D printing accuracy in existing technologies.

A detailed description to the above steps will be performed in the following.

In some embodiments, the testing experiments on the a linear-path control transfer function, a start-stop control transfer function, and a corner control transfer function are performed repeatedly by the system for different printing materials. Thus, a printing parameter library for different printing materials are established, and a deep learning training is performed on the printing parameter library, This is done to construct a pre-built system control strategy for the printing system, enabling intelligent matching of printing parameters for different materials, printing filament diameter and layer thickness requirements. For example, prior to step S110, the method may also include the following steps:

Step a) obtaining multiple data to be printed, using preset test functions to perform printing tests on the multiple data to obtain multiple test results.

Step b) establishing a printing parameter library based on the multiple data to be printed and corresponding test results.

Step c) performing a deep learning training on the printing parameter library to obtain the preset printing control strategy.

For step c) above, the preset printing control strategy is used for adjusting the printing parameters in the printing feedback control strategy and the spatiotemporal recombination control strategy.

For example, the preset printing control strategy is a control transfer function established based on rheological properties of the printing materials and measurements of a printed filament, which is the control transfer function of the filament diameter, the layer thickness, and control parameters of a printing system, including any one or more of: a linear-path control transfer function, a start-stop control transfer function, and a corner control transfer function.

The method for quantifying the filament diameter can be used to calculate the filament diameter. The method for quantifying the filament diameter utilizes the 3D image data of each layer in the printed structure to calculate the thread diameter more accurately, which can avoid errors caused by 2D data. The specific process steps are as follows: first, obtaining the 3D image data I(x,y,z) of the printed structure; then performing binary thresholding and image inversion on the 3D image data I(x,y,z) to obtain $I_{BW}(x,y,z)$ and $I_{BW_R}(x,y,z)$, and the so-called inversion processing is to set the voxels with a signal value of 1 in an original binarized image to 0, and set the voxels with a signal value of 0 in the original binarized image to 1; then, Euclidean distance transformation is performed on $I_{BW_R}(x,y,z)$ to obtain $I_{ED}(x,y,z)$, the Euclidean distance between two points $(x_1,y_1,z_1)$ and $(x_2,y_2,z_2)$ in three-dimensional space, which is:

$$d=\sqrt{(x_1-x_2)^2+(y_1-y_2)^2+(z_1-z_2)^2}.$$

Figure 4A:
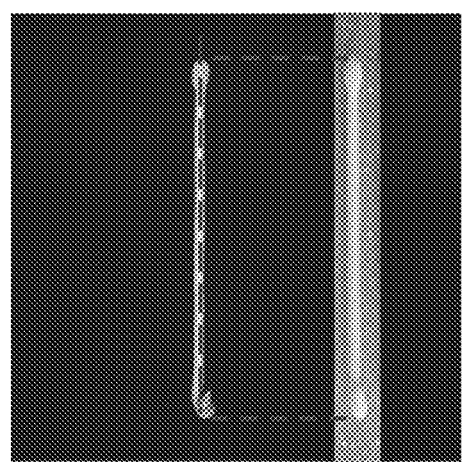
FIG. 4A is a 3D printed P-OCT imaging result graph and photo of a single filament.
Figure 4B:
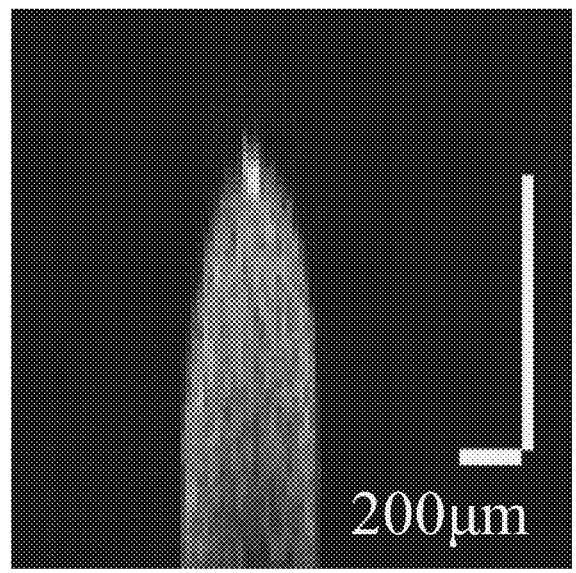
FIG. 4B is a fault map in a X-Z direction at a dashed line of FIG. 4A.
Figure 4C:
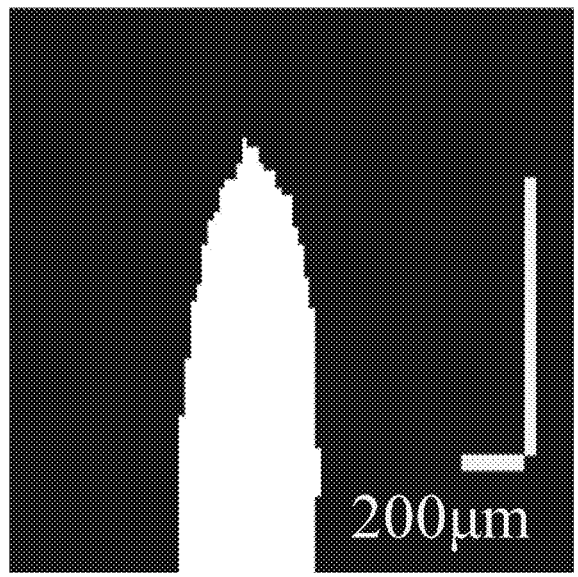
FIG. 4C is a corresponding binarization result graph.
Figure 4D:
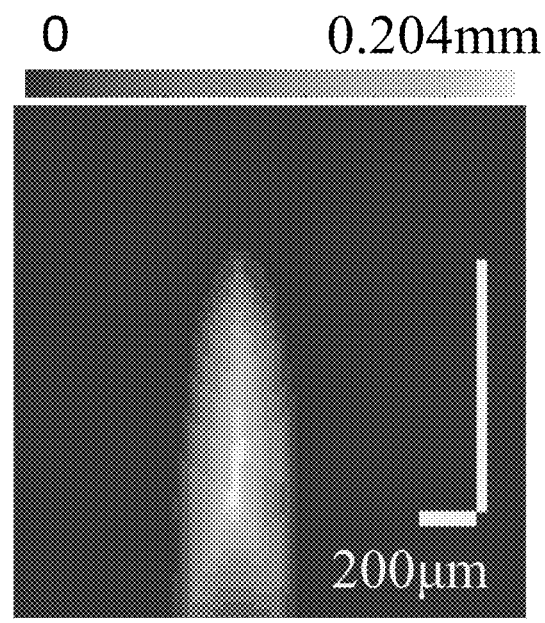
FIG. 4D is a Euclidean distance transformation results graph corresponding to FIG. 4B.
Figure 4E:
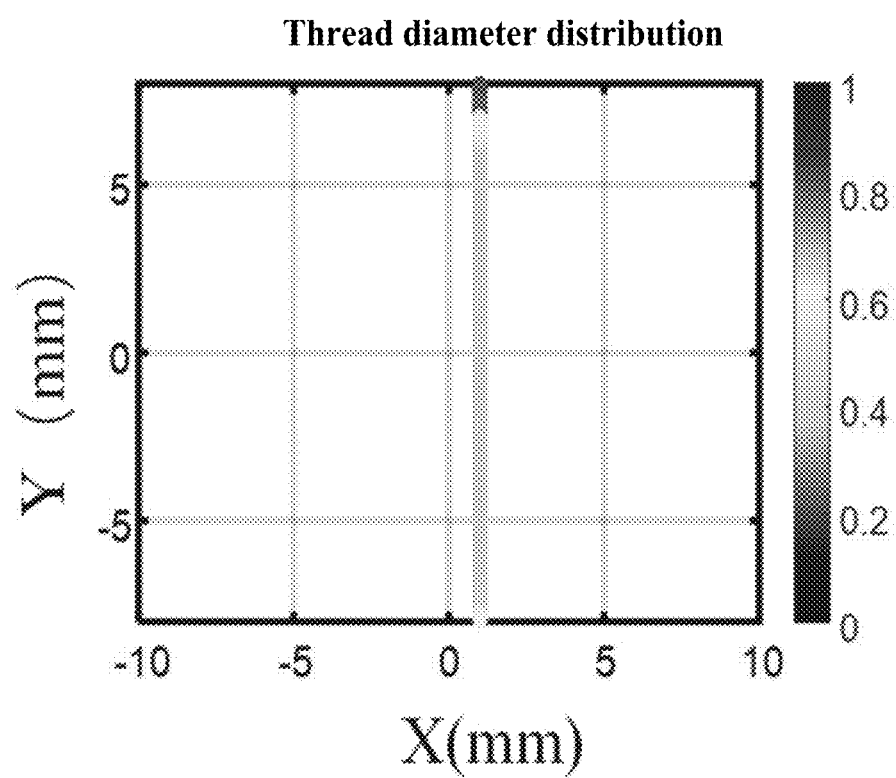
FIG. 4E is a thread diameter distribution graph of an entire filament.

The so-called Euclidean distance transformation refers to the transformation of the values of pixels in the foreground into the Euclidean distance from the point to the nearest background point (assuming white as the foreground color and black as the background color), in a set of binary images. Thus, it can be obtained that in a continuous printing structure, twice the maximum value of the Euclidean distance transformation corresponding to each extruded filament is the filament diameter at the current position. The results of the method for quantifying the thread diameter are shown in FIGS. 4A-4E. FIG. 4A is the 3D printed P-OCT imaging result and photo of a single filament (enlarged on the right side). FIG. 4B is a fault map in the X-Z direction at the dashed line of FIG. 4A. FIG. 4C is the corresponding binarization result. Binary processing, inversion, and Euclidean distance transformation can be performed on 3D P-OCT data to obtain the filament diameter information. The Euclidean distance transformation results corresponding to the above fault map are shown in FIG. 4D, where the filament diameter can be represented by twice the middle maximum value. The diameter distribution of the entire filament is shown in (e) of FIG. 4, with a larger diameter at the endpoint and a uniform diameter distribution in the middle linear section.

Figure 5A:
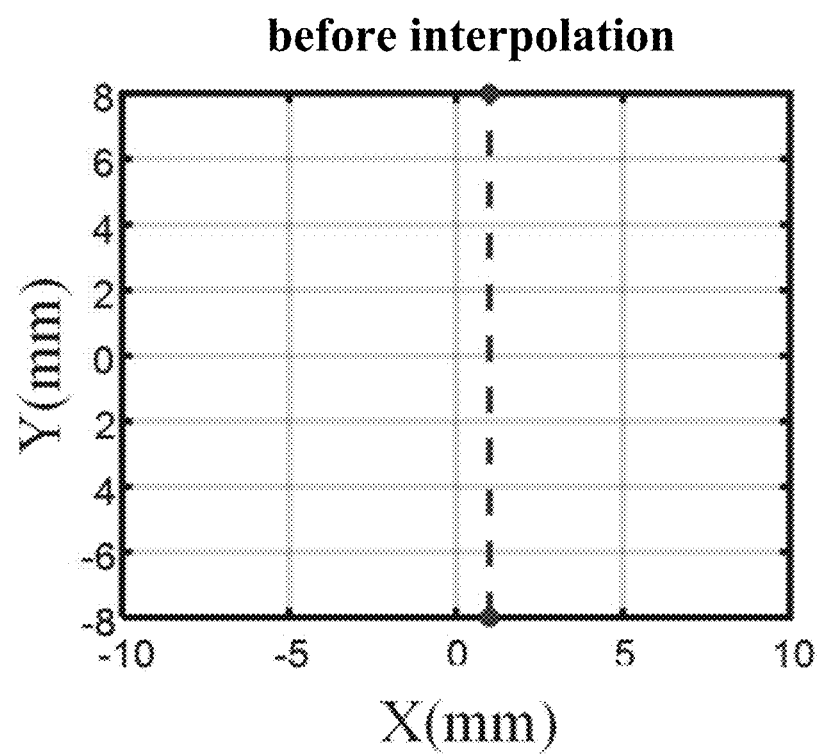
FIG. 5A is a Gcode path nodes graph before interpolation.
Figure 5B:
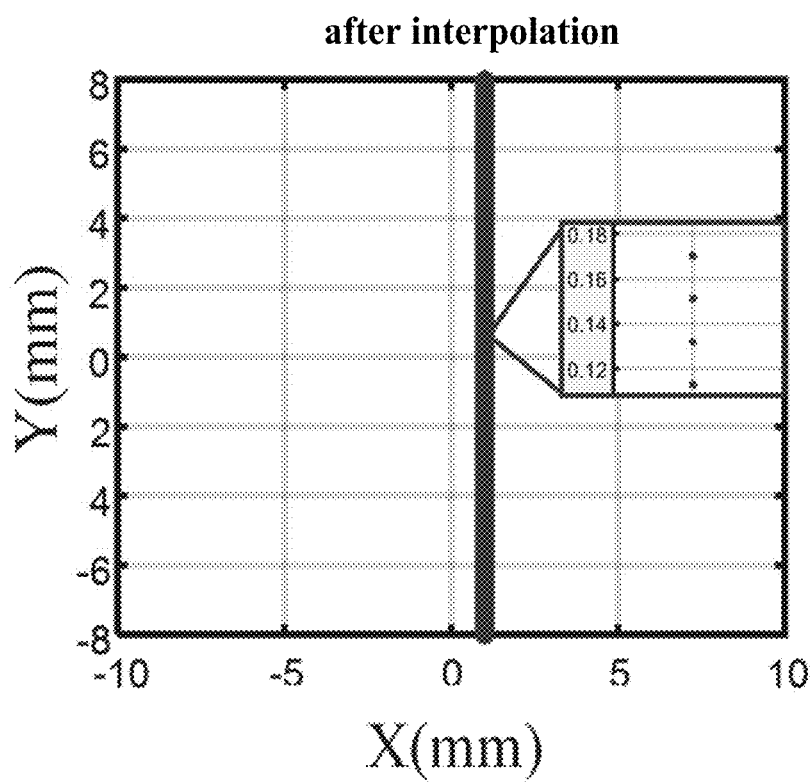
FIG. 5B is a Gcode path nodes graph after interpolation.
Figure 5C:
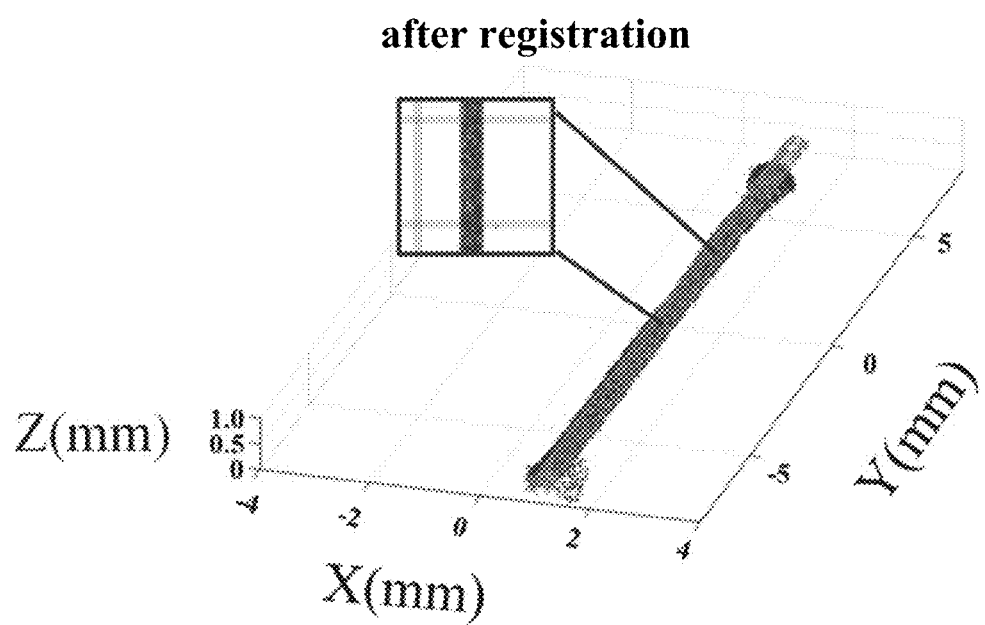
FIG. 5C is registered results graph.

As another example, 3D imaging devices can also synchronously use a layer thickness quantification method to calculate layer thickness. The method for quantifying the layer thickness combines the design model generated by the GCode (a 3D printing instruction) path with the reconstructed model scanned by the 3D imaging device to perform the quantification analysis of the layer thickness. The specific process steps are as follows: first, generating the design model by using the GCode path, linearly interpolating the GCode path nodes, and making their resolution consistent with that of the 3D imaging device (X-Y direction); the Gcode path nodes before and after interpolation are shown in FIG. 5A and FIG. 5B, respectively. Then, a 3D design model is generated based on an elliptical equivalent model using interpolated GCode nodes, a target filament diameter, and a target layer thickness as a center, major axis, and minor axis of an ellipse, respectively. The reconstructed model obtained by the 3D imaging device is registered with the 3D design model generated by a GCode path. The registered results are shown in FIG. 5C. Then, $PT_{GCode}$ of each registered GCode node and upper surface point $PT_{S\_P-OCT}$ in 3D imaging device scanning reconstructed model are obtained, and $PT_{GCode}$ and $PT_{S\_P-OCT}$ are projected onto the XY plane. For each point $PT_{xy\_GCode}(i)$ of the GCode node after projection on the XY plane, the nearest PT $PT_{xy\_S\_P-OCT}(i)$ (referred to as the matching point) is searched in a XZ plane, the distance is denoted as:

$$Dis_{xy}(i) = \|PT_{xy\_Gcode}(i) - PT_{xy\_S\_P-OCT}(i)\|_2;$$

Then, searching for the corresponding point $PT_{S\_P-OCT}(i)$ in 3D space by utilizing coordinates of $PT_{xy\_S\_P-OCT}(i)$ in the XY plane; recording Z-coordinates of the corresponding point $PT_{S\_P-OCT}(i)$ as the layer thickness $z_{PT_{P-OCT}}(i)$; then calculating a mean distance and standard deviation between the point $PT_{xy\_GCode}(i)$ and the matching point $PT_{xy\_S\_P-OCT}(i)$ $$Mean\_Dis_{xy} = \|PT_{xy\_GCode}(l) - PT_{xy\_S\_P-OCT}(l)\|_2;$$

$$\delta\_Dis_{xy} = \sqrt{\frac{\sum_{i=1}^{N}(Dis_{xy}(i) - Mean\_Dis_{xy})^2}{N-1}};$$

$z_{PT_{P-OCT}}(i)$ represents the layer thickness where the distance between the matching points is 3 times the mean standard deviation. The layer thickness at a distance exceeding 3 times the mean standard deviation at the matching point is 0, indicating the presence of a broken filament defect.

$$LT_{(i)} = \begin{cases} z_{PT_{P-OCT}}(i), & Dis_{xy}(i) < Mean\_Dis_{xy} + 3\delta\_Dis_{xy} \\ 0, & Dis_{xy}(i) > Mean\_Dis_{xy} + 3\delta\_Dis_{xy} \end{cases};$$

Figure 5D:
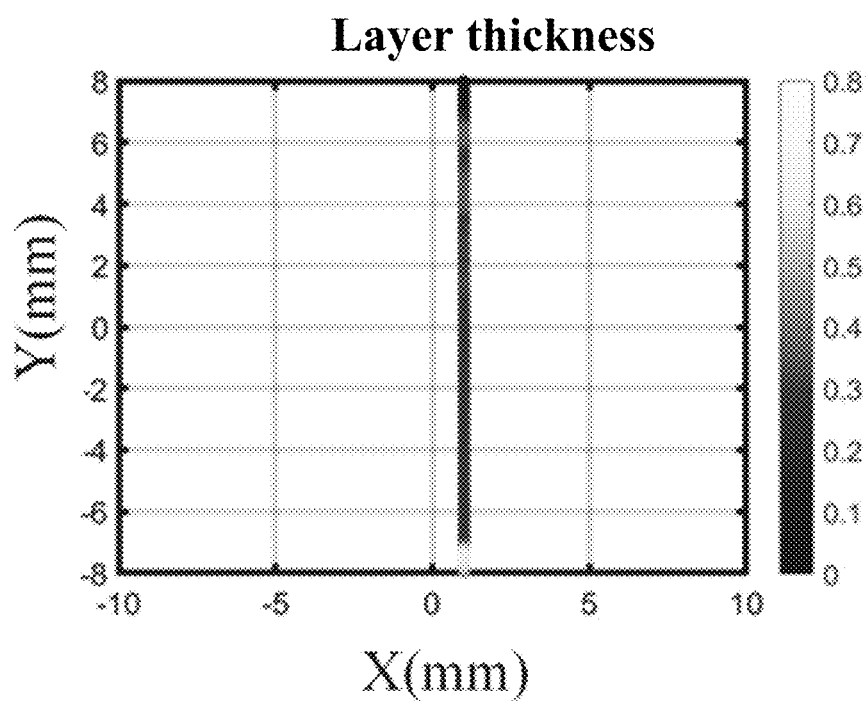
FIG. 5D is a layer thickness distribution graph.
Figure 6A:
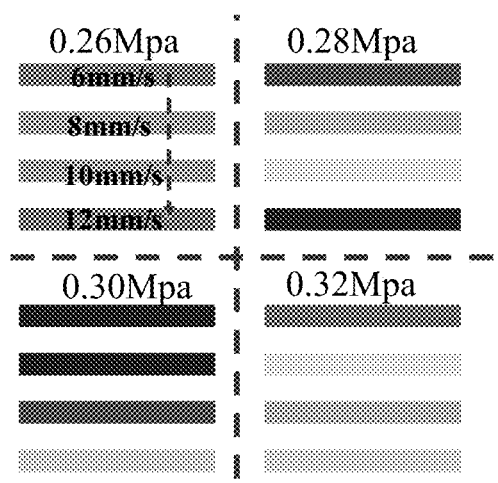
FIG. 6A is a graph of printing path and corresponding printing parameters.
Figure 6B:
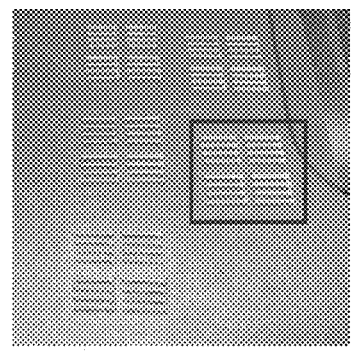
FIG. 6B is a photo of the printed object.
Figure 6C:
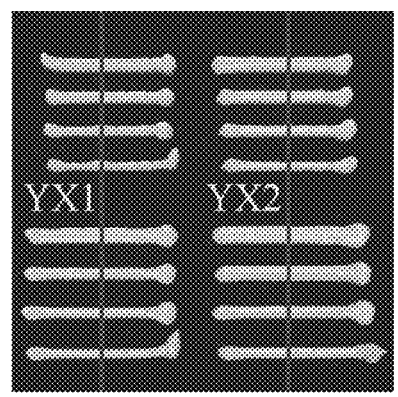
FIG. 6C is imaging results graph of the 3D imaging device corresponding to the rectangular box of FIG. 6B.
Figure 6D:
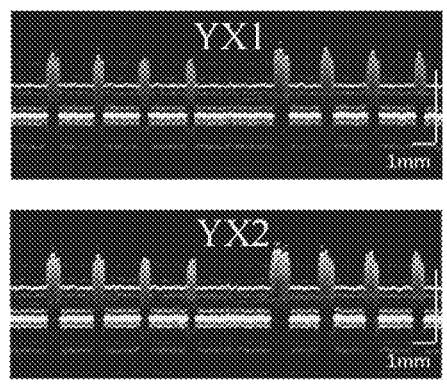
FIG. 6D is a fault map corresponding to FIG. 6C.
Figure 6E:
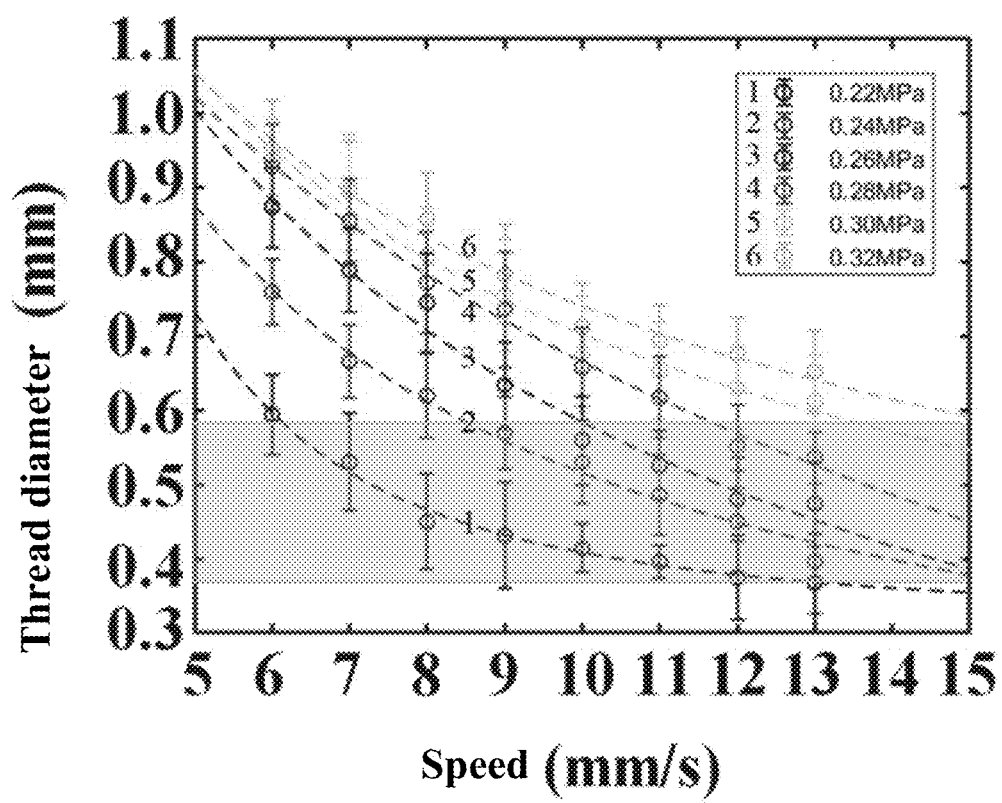
FIG. 6E is a schematic diagram of filament diameter values and their surface fitting results under different input pressure and speed.
Figure 6F:
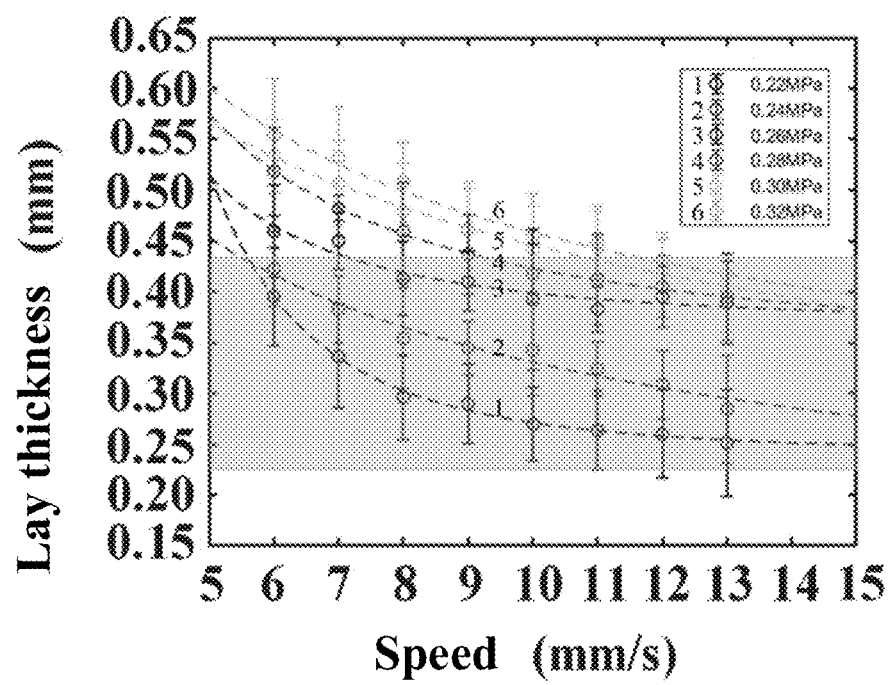
FIG. 6F is a schematic diagram of a layer thickness and surface fitting results under different input pressure and speed.
Figure 6G:
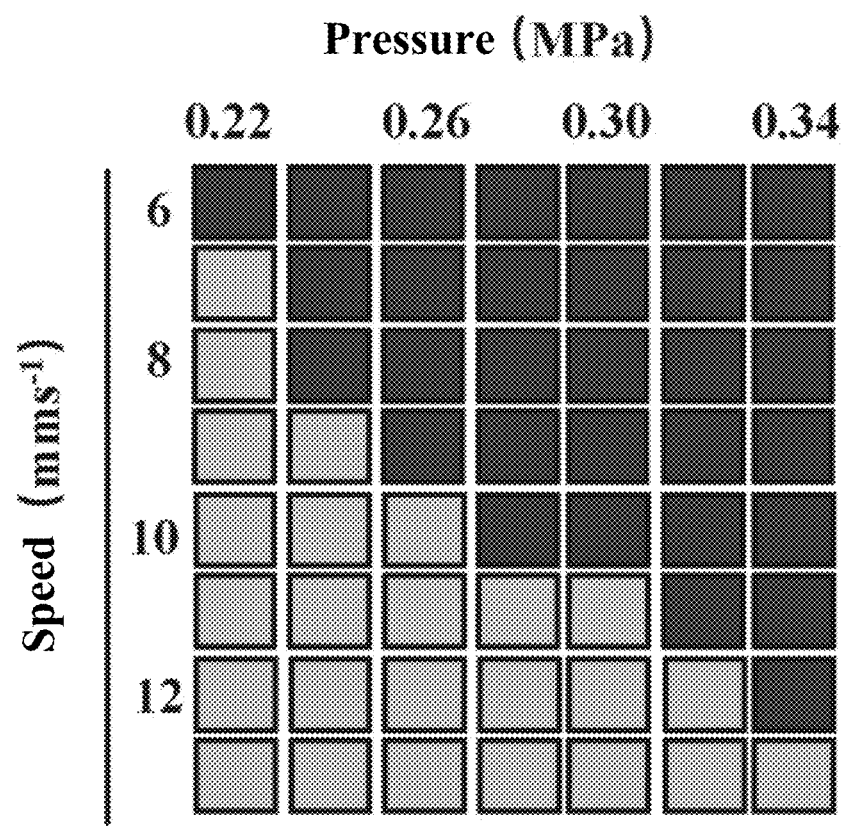
FIG. 6G is a the distribution graph of printing parameters.
Figure 6H:
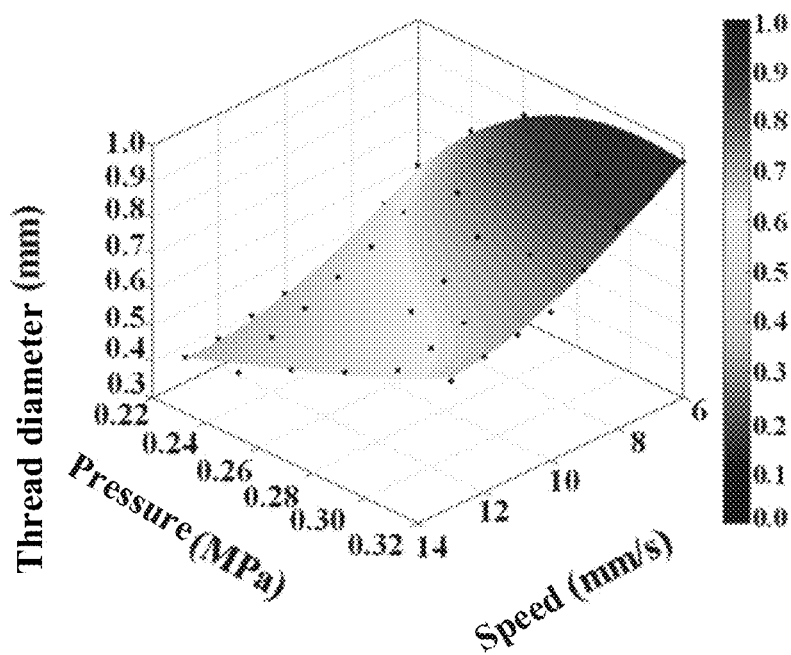
FIG. 6H is a pressure-speed combination graph with different thread diameter.
Figure 6I:
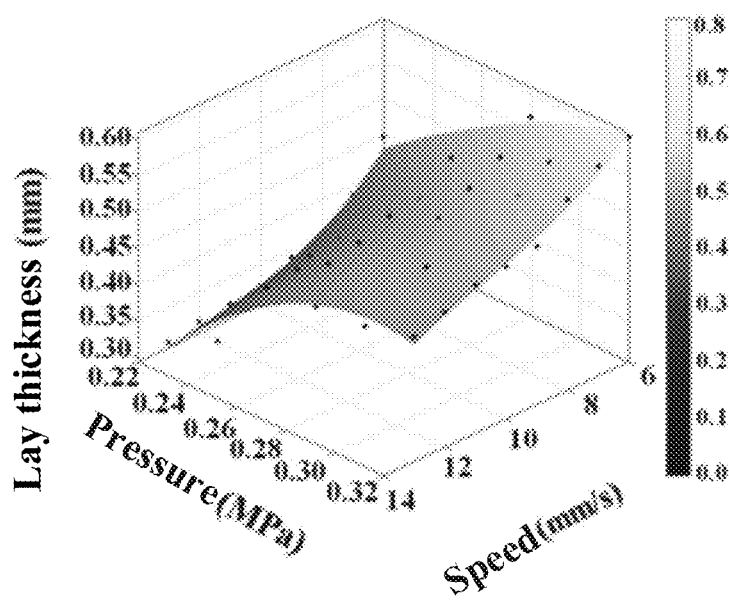
FIG. 6I is a pressure-speed combination graph with different layer thickness.

In the above formulas, i represents the node numbers of the interpolated GCode. The layer thickness at each location is extracted in the XY direction and pseudo-colors are assigned to display a layer thickness distribution as shown in FIG. 5D; If $LT_{(i)}=0$, it indicates that the node has a broken thread defect, so a method for calculating the layer thickness can be used for detecting the broken thread defect and extracting coordinates of the broken filament. As another example, in the linear-path section, the printing defects that are prone to occur include the thread diameter errors and the layer thickness errors, which are mainly related to rheological properties of the printing materials and time drift in the printing environment. The corresponding control strategies are constructed by pre-experiments for the target printing material, target printing filament diameter, and layer thickness. A suitable inner diameter needle (such as 0.41 mm) is selected for the target printing materials (such as hydroxyapatite), target filament diameter (such as 0.48 mm), and target layer thickness (such as 0.33 mm), and the material characteristic testing experiments are performed with different input speeds and pressure parameters. Specifically, the input pressure range in the pre-experiment can be selected based on printing experience $P_{min} \sim P_{max}$ and pressure interval $\Delta P$, and input speed range $V_{min} \sim V_{max}$, and speed interval $\Delta V$, such as $P_{min}=0.22$ MPa, $P_{max}=0.34$ MPa, $\Delta P=0.02$ MPa; $V_{min}=6$ mm/s, $V_{max}=13$ mm/s, $\Delta V=1$ mm/s Pre-printing is performed by using input parameter combination, and data is acquired using a 3D imaging device, and the filament diameter and the layer thickness are analyzed based on the quantification method described above. Considering the significant deviation between the thread diameter and the layer thickness near the starting and end points of the printing path and the target value, the average filament diameter and layer thickness obtained under different combinations of input pressure and speed parameter are analyzed, and the data is used for surface fitting to obtain the surface fitting function for the filament diameter and the layer thickness under the corresponding material and needle conditions. In the pre-experiment for linear-path, the printing path and corresponding printing parameters are shown in FIG. 6A, where the printing length of each section is set to 8 mm, and the overall field of view in the X-Y direction is within the range of 19 mm*19 mm. P-OCT can collect 2*2 field-of-view and perform one-time large field of view data stitching. The photo of the printed object is shown in FIG. 6B, the imaging results of the 3D imaging device corresponding to the rectangular box are shown in FIG. 6C, and the fault map corresponding to the dashed line 601 is shown in FIG. 6D. Based on the 3D imaging data obtained with different input parameters, the filament diameter and the layer thickness analysis in the previous section can be performed to obtain the filament diameter values and their surface fitting results under different input pressure and speed shown in FIG. 6E, and the layer thickness and their surface fitting results under different input pressure and speed shown in FIG. 6F. FIG. 6G shows the distribution of printing parameters (gray represents normal printing parameters, black represents printing with fine filament diameter or layer thickness that exceed the acceptable range of the target). As shown in FIG. 6H and FIG. 6I, the optimal combination of air pressure and speed for the target filament diameter FS (0.48 mm) and target layer thickness LT (0.33 mm) is 0.24 MPa and 11 mm/s, respectively.

Figure 7A:
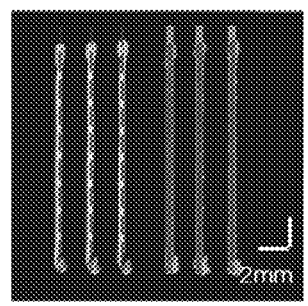
FIG. 7A is a 3D image of the structure before compensation to determine the extrusion delay of the material.

As another example, the material deposition errors occur due to the air pressure response delay of the pneumatic-extruded 3D printing device, including no material deposition within a certain distance from the starting point of the path, and excessive material deposition occurs at the beginning of material deposition. There is also excessive material deposition at the end point of the path. In order to avoid material deposition errors caused by pressure response delay, including path errors and excessive material deposition, the optimal combination of the input pressure P and speed V (such as 0.24 MPa and 11 mm/s) suitable for the linear path is selected for a response delay compensation in the pre-experiment, in respect to the target printing material, target thread diameter, target layer thickness, and target needle. A 3D imaging device is used to image the structure before compensation to determine the extrusion delay of the material, as shown in FIG. 7A. The path error $\Delta l$ caused by pressure response delay, and the corresponding pressure response delay time $$\tau_1 = \frac{\Delta l}{V}$$

Figure 7B:
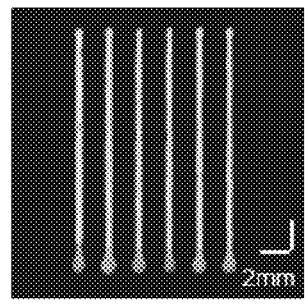
FIG. 7B is a graph of $\tau_1$ before extruding the filament.
Figure 7C:
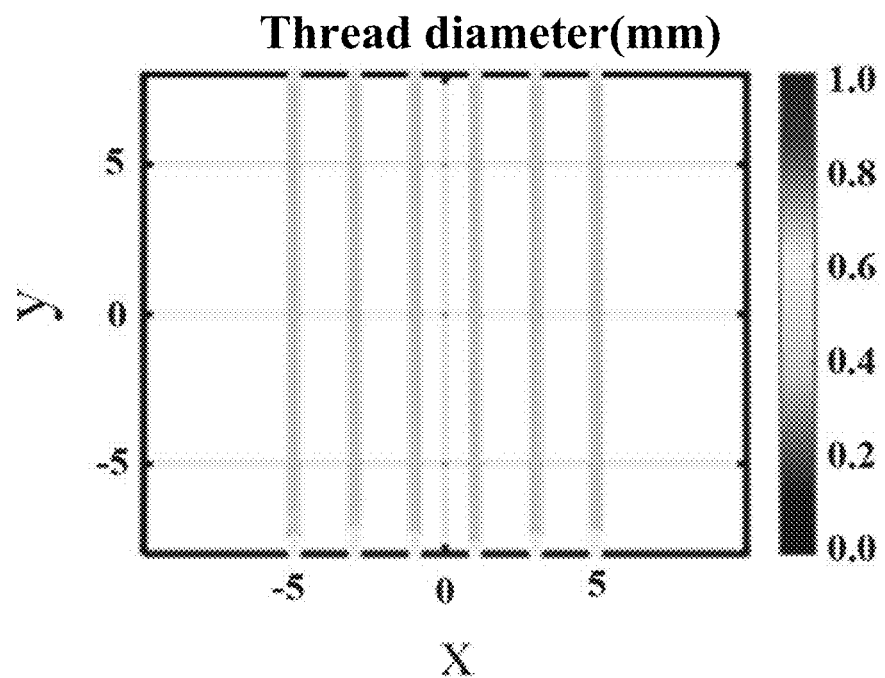
FIG. 7C is a schematic diagram of a thread diameter error.
Figure 7D:
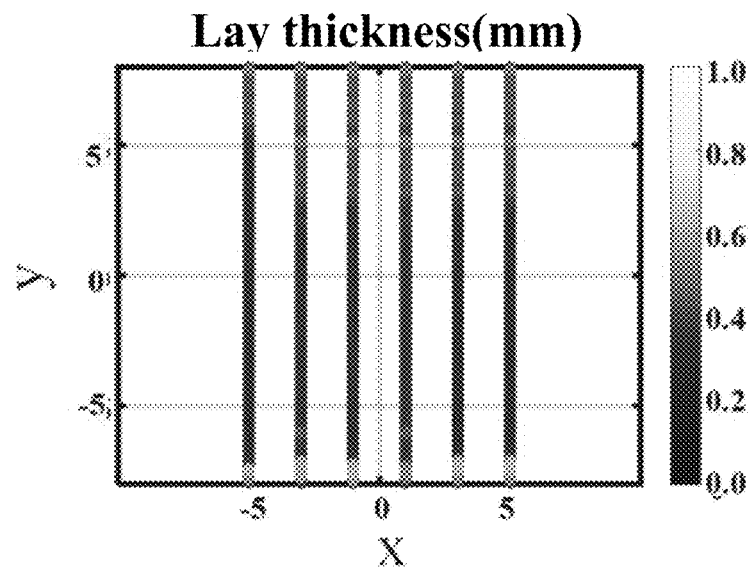
FIG. 7D is a schematic diagram of a layer thickness error.
Figure 7E:
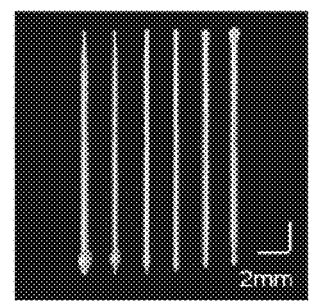
FIG. 7E is a printing results image obtained using different advanced filament discharge times and advanced filament-broken times.
Figure 7F:
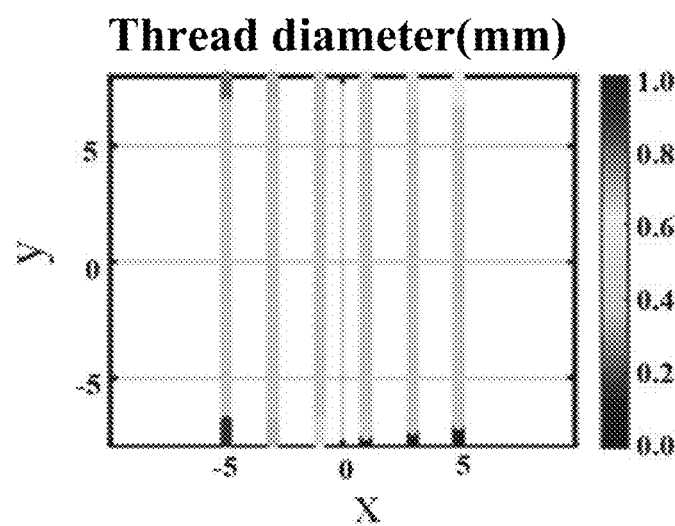
FIG. 7F is a statistical results image of the thread diameter.
Figure 7G:
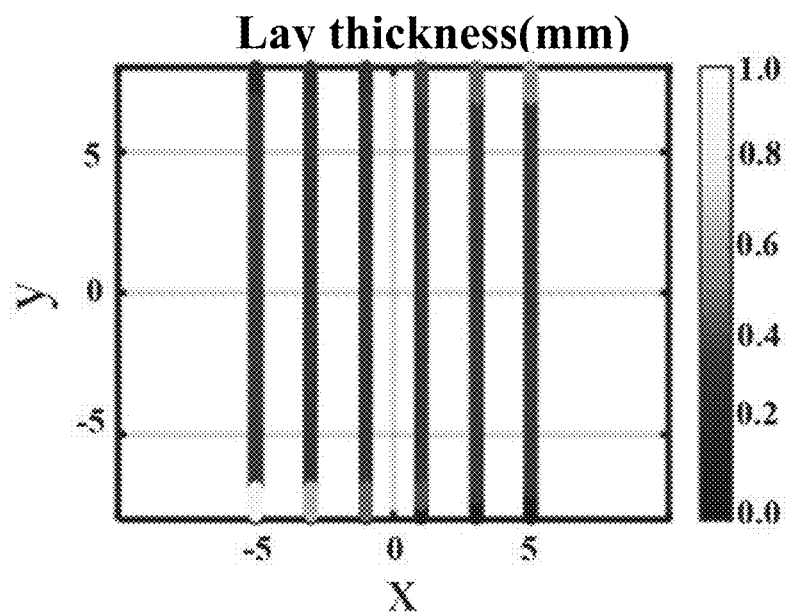
FIG. 7G is a statistical results image of the lay thickness.
Figure 7H:
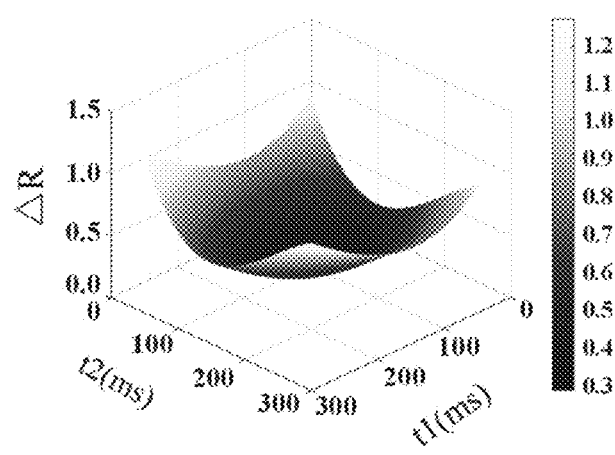
FIG. 7H is a schematic diagram of a material deposition error and surface fitting results under different advanced filament discharge times and advanced filament-broken times.

(comprises a certain delay in speed response but accounts for a small proportion which can be ignored here) are obtained by comparing the design path with the actual material deposition path. However, compensating for $\tau_1$, that is $\tau_1$ before extruding the filament, is shown in FIG. 7B, although the design path is consistent with the actual material path, there is excessive material deposition at the starting point, resulting in thread diameter error (as shown in FIG. 7C) and layer thickness error (as shown in FIG. 7D). This is because the material extruded by the needle needs to accumulate to a certain amount before it begins to deposit on the substrate, so there is also a deposition delay time $\tau_2$. Similarly, there is also excessive material deposition at the end point of the path, which is impacted by the stopping of the extrusion response delay $\tau_3$ at the end point. The determination of the above-described $\tau_2$ and $\tau_3$ is related to excessive material deposition and substrate material, to accurately correct the hysteresis of air pressure response ($\tau_1$, $\tau_2$, $\tau_3$). A pre-experimental method is selected to determine the final advanced filament discharge time $t_1$ and the advanced filament-broken time $t_2$. The printing results obtained using different advanced filament discharge times and advanced filament-broken times ($t_1$=50 ms, 100 ms, 150 ms, 200 ms, 250 ms, 300 ms; $t_2$=50 ms, 100 ms, 150 ms, 200 ms, 250 ms, 300 ms) are shown in FIG. 7E. Correspondingly, the statistical results of the thread diameter and the layer thickness are shown in FIG. 7F and FIG. 7G. Statistics are performed on the path error, filament diameter deviation, and layer thickness deviation of the starting and end points. The path error is represented by the difference $\Delta l$ between the design path and the actual material path. The filament diameter deviation is calculated using the average deviation $\Delta FS$ of the actual filament diameter and the target filament diameter at the starting and end points, and the layer thickness deviation is calculated using the average deviation $\Delta LT$ of the actual layer thickness and the target layer thickness at the starting and end points, respectively. A material deposition error and surface fitting results under different advanced filament discharge times and advanced filament-broken times are shown in FIG. 7H. Thus, the optimal advanced thread discharge time and advanced thread-broken time for the target material, a target filament diameter, and a target layer thickness can be selected to reduce material deposition errors caused by the material pressure response delay.

Figure 8A:
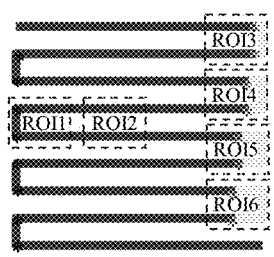
FIG. 8A is a schematic diagram of common right-angle corner paths.
Figure 8B:
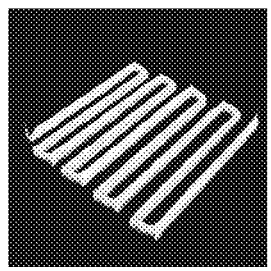
FIG. 8B is a graph of a path map.
Figure 8C:
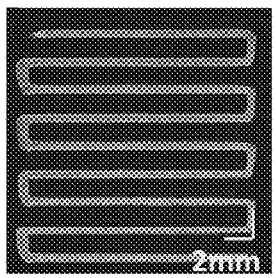
FIG. 8C a 3D image of FIG. 8B.
Figure 8D:
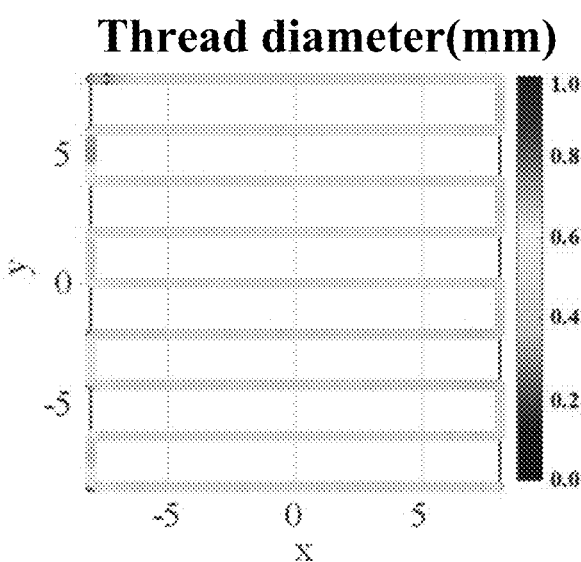
FIG. 8D is a graph of filament diameter distribution
Figure 8E:
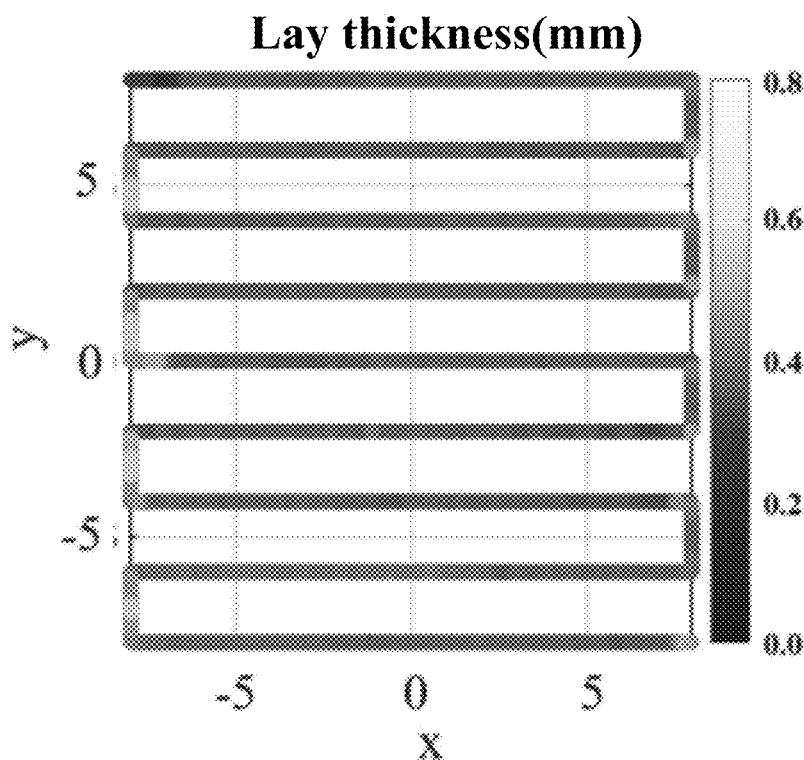
FIG. 8E is a graph of layer thickness distribution.
Figure 8F:
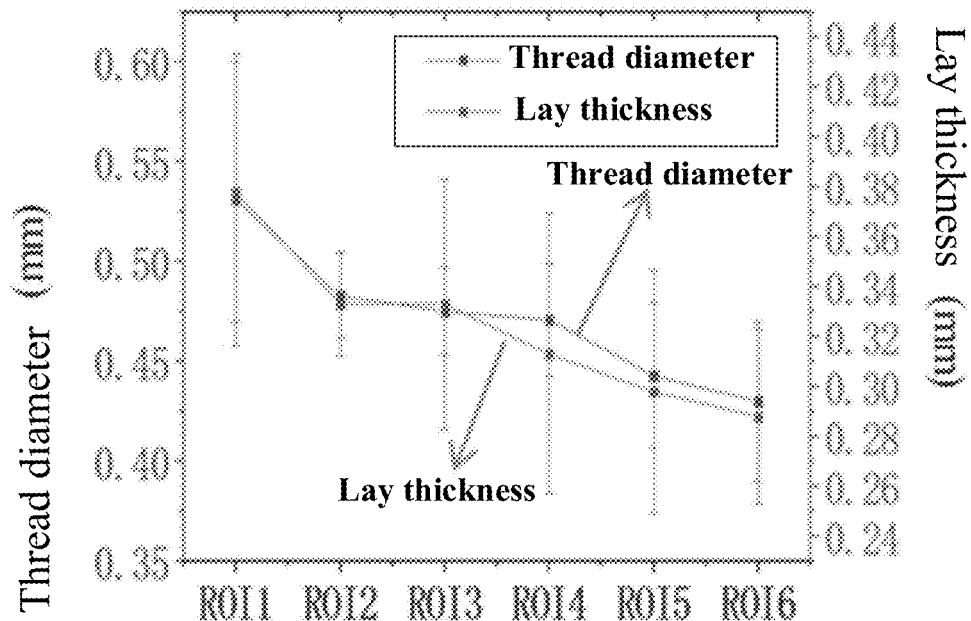
FIG. 8F is a schematic diagram of the filament diameter and the layer thickness in four target regions of R0I3-6.

As another example, in addition to the linear and start-stop sections described above, the material deposition errors often occur at the corner of the printing path. There is speed change near the node at the corner, and when the input speed V does not match the value of air pressure P and the rheological properties of the material, it will result in material deposition errors. The present disclosure provides feedback compensation for the thread diameter and the layer thickness defects at the corner of the common right-angle corner paths (as shown in FIG. 8A). In 3D printing, GCode nodes are usually set at the corner. Due to the presence of acceleration and deceleration zones in front of and behind the node, a lower average speed can easily lead to excessive material deposition, resulting in defects in the filament diameter and the layer thickness. In order to compensate for the filament diameter and the layer thickness defects at the corner, the position and speed of nodes near the corners in GCode can be adjusted to avoid excessive material deposition. The actual adjustment parameters are obtained by pre-experiments, including increasing nodes at a distance of $l_a$ in front of the corner and $l_a$ behind the corner, and increasing speed $\Delta v$ at the corner. Specifically, the pre-experiment is performed by setting different $l_a$ and $\Delta V$ (such as $l_a$=0.5 mm, 1.0 mm, 1.5 mm, 2.0 mm; $\Delta V$=0.5 mm/s, 1.0 mm/s, 1.5 mm/s, 2.0 mm/s). By analyzing the filament diameter and the layer thickness at the corner, the average filament diameter error $\Delta FS$ and the average layer thickness error $\Delta LT$ are statistically analyzed. Therefore, a material deposition error $\Delta T$ at the corner can be expressed as the sum of $\Delta FS$ and $\Delta LT$. As shown in FIG. 8A to FIG. 8E, they are the path map, 3D imaging data, 3D imaging cross-section, filament diameter distribution, and layer thickness distribution, wherein the left corner is a result without defect compensation, and the GCode node is located at the right-angle corner. The filament diameter and the layer thickness are larger than the target value, resulting in material deposition errors. The right corner is a result of defect compensation, wherein the R0I3, R0I4, R0I5, and R0I6 on the right side of FIG. 8A represent the nodes added at 0.5 mm, 1 mm, 1.5 mm, and 2 mm in front of (or behind) the node at the corner, while the speed is increased from the original 11 mm/s to 12 mm/s. The analysis of the filament diameter and the layer thickness in the four target regions of R0I3-6 is shown in FIG. 8F, wherein the average filament diameter of R0I1-R0I6 is 0.531±0.073 mm, 0.483±0.021 mm, 0.475±0.022 mm, 0.471±0.028 mm, 0.443±0.036 mm, 0.430±0.040 mm, respectively; the average layer thickness of R0I1-6 is 0.378±0.052 mm, 0.333±0.021 mm, 0.333±0.050 mm, 0.313±0.056 mm, 0.298±0.0489 mm, 0.288±0.035 mm, respectively. It can be seen that the filament diameter and the layer thickness defects at the corner after compensation are smaller than those at the corner before compensation (R0I1); the one closest to the target filament diameter and target layer thickness (R0I2) in the linear path is R0I3. For the target material (such as hydroxyapatite), under the compensation condition of adding nodes 0.5 mm in front of (or behind) the corner node and increasing the speed of the path between nodes (from 11 mm/s to 12 mm/s), the target thread diameter (0.480 mm) and layer thickness (0.330 mm) can be obtained at the corner, eliminating material deposition errors at the corner. Thus, it is possible to perform testing experiments on the control transfer function, the start-stop control transfer function, and the corner control transfer function for different printing materials. A printing parameter library for different printing materials can be established, and deep learning training can be performed on the printing parameter library to construct a pre-constructed system control strategy for the printing system, which can better reflect the precise matching of printing materials and the printing system, and more accurately determine the system control scheme to improve printing accuracy and fidelity.

Based on steps a), b), and c) above, the system can monitor the printing process and results in real time by an environmental monitor and 3D image monitor. Relevant information about the printing process and results can be fully obtained by comprehensive monitoring, which improves the combination with preset feedback control strategies and the printing accuracy. For example, the monitor comprises an environmental monitor and 3D imaging device. The above method S120 can specifically include the following steps: Step d) monitoring a printing environment using an environmental monitor to obtain an environmental monitoring information corresponding to the printing environment. Step e) monitoring the printing structure and the printing results using a 3D imaging device to obtain a 3D imaging structure monitoring information corresponding to the printing and printing result.

Step f) based on environmental monitoring information and 3D imaging structure monitoring information, obtaining the monitoring information corresponding to the printing environment, the printing structure, and the printing results.

For example, the distributed sensing can be used to monitor the environmental parameters of printing, including the temperature of each independent nozzle (such as material storage area, flow area, jetting area), environment temperature, platform temperature, environment humidity, air pressure controlled by the printing nozzle, three-axis movement speed of the motion platform, three-axis coordinates of the starting position, etc. 3D imaging can also be used to monitor the structural changes during printing online. The imaging devices that can be integrated with the printing system and detect the 3D structure of the printing online are preferred.

Single-point measurement and manual measurement in existing technology lack no spatial distribution. The surface contour information of the 2D cameras and 3D scanners, and 3D volume imaging data projections cannot obtain complete 3D structural information. The embodiments of the present disclosure are based on a method for quantifying the filament diameter, the layer thickness, and fidelity using 3D volume data, which provides more accurate quantitative detection and promotes the development of control strategies. The detection of environmental parameters during printing adopts distributed sensing. Compared with the overall sensing of traditional printing environments, it can independently monitor temperature, humidity, extrusion pressure, and movement speed in multiple areas such as the material reservoirs, nozzle channel, and nozzle tip. It is very suitable for large-scale printing of bio-inks and long-term continuous printing of models.

Based on the above steps d), e), and f), a method for sensing and monitoring the printing is proposed, and the environmental parameters and process structure information of the printing are considered together by the feedback control of the printing. The MIMO ILC control scheme is adopted, which can efficiently adjust the printing parameters in time according to the printing monitoring structure and repair defects such as breakage, collapse, and compression in time, rather than iteratively providing feedback by 3D detection after printing, which will improve printing efficiency and success rate, and reduce material waste. For example, the above method S130 can specifically include the following steps:

Step g) performing first information processing operation on the monitoring information to obtain the imaging field size corresponding to the monitoring information.

Step h) comparing the imaging field size with the preset lateral size to obtain the first comparison result.

Step i) making a first adjustment to the preset printing parameters based on the first comparison result.

Figure 9:
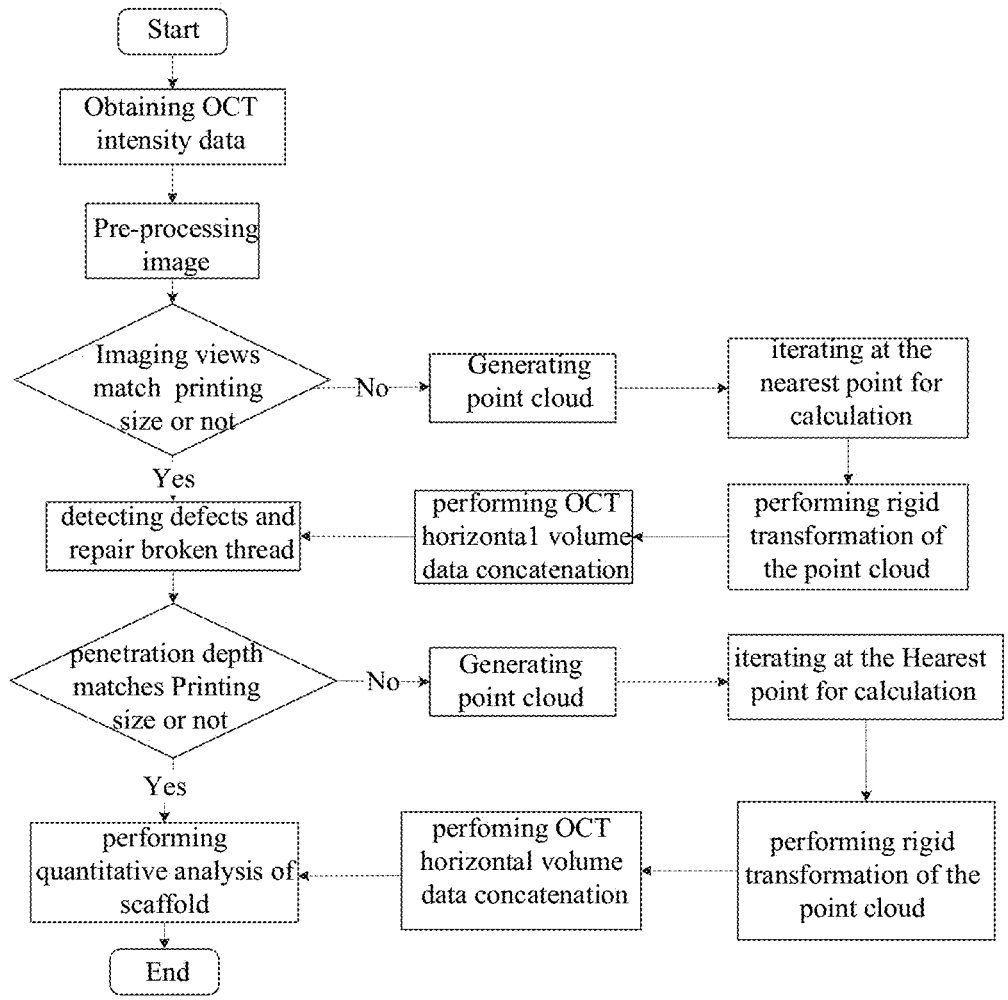
FIG. 9 is a flowchart of an online monitoring and feedback method provided in the embodiments of the present disclosure of the present disclosure.

For example, as shown in FIG. 9, OCT, LSCM, PAI or MPM intensity data can be obtained by the system firstly, and the original 3D OCT, 3D LSCM, 3D PAI or 3D MPM data can be processed to generate a series of 3D OCT, 3D LSCM, 3D PAI or 3D MPM intensity images. Then, 3D OCT, 3D LSCM, 3D PAI or MPM intensity images can be preprocessed, including but not limited to: Gaussian filtering, binarization, morphological processing, etc., to suppress speckle and stripe noise. Then, the imaging field of a single OCT, 3D LSCM, 3D PAI or MPM can be compared with the size of the printed structure (XY plane), and if it meets the requirements, the other adjustments can be made. If the printing structure size is large and does not meet the requirements, the horizontal field of view expansion will be entered to generate a point cloud, iterative nearest point calculation are conducted to perform rigid transformation of the point cloud. Then, perform the OCT, LSCM, PAI or MPM horizontal volumetric data are stitched together, followed by other adjustments.

By performing the first information processing operation on the monitoring information, the system obtains the imaging field size corresponding to the monitoring information. Then, the imaging field size is compared with the preset horizontal size to obtain the first comparison result. Based on the first comparison result, the preset printing parameters can be adjusted in real-time, ensuring the accuracy of printing.

Based on the above steps d), e), and f), a method for sensing and monitoring the printing is proposed, and the environmental parameters and process structure information of the printing are considered together by the feedback control of the printing. The MIMO ILC control scheme is adopted, which can efficiently adjust the printing parameters in time according to the printing monitoring structure and repair defects such as breakage, collapse, and compression in time, rather than using iterative feedback by 3D detection after printing, this approach will improve printing efficiency and success rate, and reduce material waste. As another example, the above method S130 can specifically include the following steps:

Step j) performing a second information processing operation on the monitoring information to obtain the effective penetration depth corresponding to the monitoring information.

Step k) comparing the effective penetration depth with the preset longitudinal size to obtain the second comparison result.

Step l) making a second adjustment to the preset printing parameters based on the second comparison result.

For example, as shown in FIG. 9, the system can compare the effective penetration depth of OCT, LSCM, PAI, or MPM with the printed structure size of the z-axis direction. If the conditions are met, other adjustments can be made. If the printed structure size of the z-axis direction is large and does not meet the conditions, the vertical field of view amplification is entered to extract the point cloud in the current layer, iterate at the nearest point for calculation, perform point cloud rigid transformation, then perform OCT, LSCM, PAI or MPM vertical volume data stitching. Subsequently, further adjustments can be made in other aspects.

By performing a second information processing operation on the monitoring information, the system obtains the effective penetration depth corresponding to the monitoring information. Then, the effective penetration depth is compared with the preset vertical size to obtain the second comparison result. The preset printing parameters can be adjusted in real-time based on the second comparison result, ensuring the printing accuracy. Based on the above steps d), e), and f), a method for sensing and monitoring the printing is proposed, and the environmental parameters and process structure information of the printing are considered together in the printing feedback control. The MIMO ILC control scheme is adopted, which can efficiently adjust the printing parameters in time according to the printing monitoring structure and repair defects such as filament breakage, collapse, and compression in time, rather than relying on iterative feedback by 3D detection after printing. This approach will improve printing efficiency and success rate while reducing material waste. As another example, the aforementioned method S130 can specifically include the following steps:

Step m) performing a third information processing operation on the monitoring information to obtain quantitative analysis results corresponding to the monitoring information. Step n) comparing the quantitative analysis results with the preset threshold to obtain a third comparison result.

Step o) making a third adjustment to the preset printing parameters based on the third comparison result.

For example, as shown in FIG. 9, the system can perform quantitative analysis on the filament diameter and the layer thickness of the printing scaffold, identify the broken filament, provide feedback on the defects details and positions, including pressure and speed adjustments, and perform filament repair, and evaluate the fidelity of the current layer. If the fidelity of the current layer is lower than the expected value, the differences between the filament diameter, the layer thickness and the preset can be analyzed further, and the control transfer function established based on the multi-input multi-output iterative control strategy is used to adjust the printing parameters, and the parameters with faster response, such as nozzle temperature, platform temperature, and axis movement speed are prioritized for adjustment, and the new printing parameters for the next layer of printing are used. The overall imaging results of the printed scaffold can also be used for quantitative analysis of the stent, including porosity, pore connectivity, and overall fidelity analysis.

The method for quantifying the fidelity is to collect data and reconstruct the 3D structure of each layer during printing, which is used for fidelity analysis of each layer and overall fidelity analysis. The specific steps comprises: firstly, generating the 3D design model based on an elliptical equivalent model using interpolated GCode nodes, a target filament diameter, and target layer thickness are used as the center, major axis, and minor axis of the ellipse, respectively; then, registering a 3D P-OCT reconstructed model $PT_{P\text{-}OCT}$ and a 3D design model $PT_{3D_{GCode}}$, the registration methods include but are not limited to ICP registration based on point cloud. After registration, traversing each point $PT_{3D\_GCode}(i)$ in the 3D design model and searching for the nearest point $PT_{P\text{-}OCT}(i)$ in the reconstructed model, and calculating a distance $Dis(PT_{P\text{-}OCT}(i), PT_{3D\_GCode}(i))$ between the two corresponding points, determining a matching degree between the two points based on their relationship by determining the distance between the two points and a matching-point distance threshold 6

$$\text{Match}(PT_{P\text{-}OCT}(i), PT_{3D\_GCode}(i)) = \begin{cases} 1 & Dis(PT_{P\text{-}OCT}(i), PT_{3D\_GCode}(i)) < \delta \\ 0 & Dis(PT_{P\text{-}OCT}(i), PT_{3D\_GCode}(i)) \geq \delta \end{cases}$$

wherein, $\text{Match}(PT_{P\text{-}OCT}(i)\ PT_{3D\_GCode}(i))$ represents the matching degree between points in two models, the matching degree of 1 represents the two points match successfully, the matching degree of 0 represents the two points match unsuccessfully. Furthermore, Fidelity of the 3D printing structure can be represented as:

$$\text{Fidelity} = \frac{1}{N}\sum_{i=1}^{N}\text{Match}(PT_{P\text{-}OCT}(i), PT_{3D\_GCode}(i));$$

wherein, N represents point cloud numbers of $PT_{3D_{GCode}}$. The method for calculating the porosity of the printed model includes: firstly, based on the synchronously obtained 3D volume data of the printed model, and recording its volume as ($V_{filament}$). The adaptive threshold method (OSTU) is applied to obtain 3D binary data for the whole 3D Data ($V_{BW}$), the corrosion expansion and opening-closing operations is used to fill the hole information to obtain the 3D binary mask volume data ($V_{total}$) of the total scaffold, the pore size ($V_{pore}$) can be calculated by the difference between the two, that is, $V_{pore} = V_{total} - V^{filament}$. The specific formula for calculating porosity is shown in the following equation:

$$VP = \frac{V_{pore}}{V_{total}} \cdot 100\% = \frac{V_{total} - V_{filament}}{V_{total}} \cdot 100\%;$$

The method for quantifying the connectivity parameters of the printing model holes includes: after performing binary inversion ($V'_{BW}$) of the P-OCT volume data of the obtained printing model, the boundary is extended by one pixel in each of the three directions (X-Y-Z). The binarized data of the expanded scaffold is marked as ($V''_{BW}$), and the area connected to the outermost amplification is marked and the volume of that area is calculated, denoted as $V_C$. The volume of the amplified boundary can also be calculated: $V_B = V''_{BW} - V'_{BW}$. Therefore, the holes connected to the outside can be calculated as $V_{poreC} = V_C - V_B$. The final formula for calculating the connectivity of holes is as follows:

$$PC = \frac{V_{poreC}}{V_{pore}} \cdot 100\%.$$

It should be noted that the logical order shown in FIG. 9 is only an example for illustration, and this embodiment of the present disclosure is not limited to this.

By performing a third information processing operation on the monitoring information, the system obtains quantitative analysis results corresponding to the monitoring information. Then, the quantitative analysis results are compared with the preset threshold to obtain the third comparison result. Based on the third comparison result, the preset printing parameters in real time can be adjusted by the system, ensuring the accuracy of printing.

In some embodiments, an image-guided spatiotemporal recombination control strategy can also be used. The 3D nozzle can accurately reposition printing of the printed tissue model, achieving position control of the tissue model regeneration process and providing a new method for controlling tissue model regeneration. For example, the aforementioned step S140 can specifically include the following steps:

Step p) obtaining spatiotemporal recombination control instructions for monitoring information.

Step q) controlling the 3D printing device based on spatiotemporal recombination control instructions to time-program to position printing on the target position, to obtain the time-programed positioning printing result.

For the aforementioned step p), the spatiotemporal recombination control instructions include target position and printing initiation time, printing materials selection, and printing parameter settings.

Figure 10:
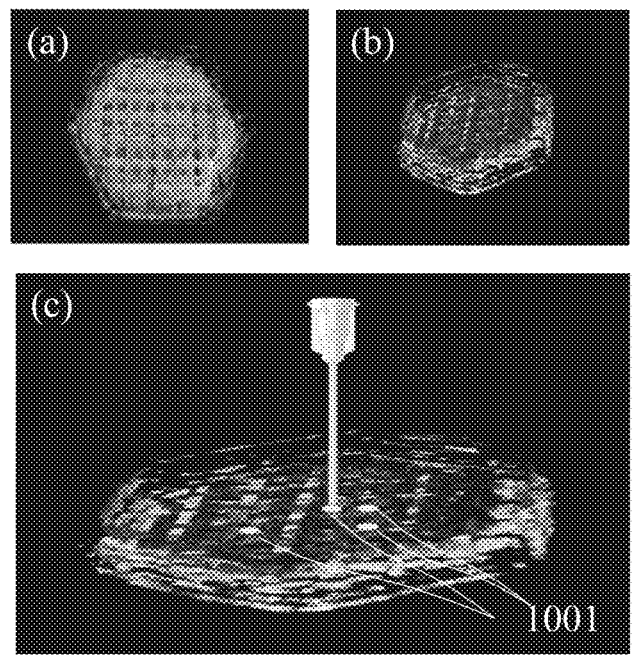
FIG. 10 is a schematic diagram of an image-guided spatiotemporal structure recombination control printing provided in the embodiments of the present disclosure of the present disclosure.

For example, the 3D printing detection and control method can be used for reprinting a tissue model during culturing, as shown in FIG. 10. The 3D reconstruction results of the scaffold during culturing are shown in FIGS. 10 (a) and (b). In the cross-sectional view of the P-OCT 3D image data, the 3D coordinate positions that need to be controlled by the program can be marked with dots (as shown in FIG. 10(c)), and the 3D nozzle can be loaded with suitable printing materials. The GCode code is customized to accurately reposition printing of a tissue model during culturing by switching the 3D nozzle to the positioning range and setting appropriate printing parameters (such as temperature, air pressure, humidity, speed, etc.) based on the pre-constructed printing system control strategy, thereby achieving positioning control of structures of the tissue model and function reconstruction. The adjustable content comprises but is not limited to cells, nutrients, growth factors, and induced cultured organoids in the local area of the tissue model. During the tissue model culture process, it is necessary to locate and induce the differentiation of specific cells in the tissue model, the required growth factors can be localized and printed by repositioning the region that requires induction.

The time-programed positioning printing result can be obtained by obtaining spatiotemporal recombination control instructions for monitoring information through the system, and then controlling the 3D printing device based on spatiotemporal recombination control instructions to time-program to position printing on the target position. This enables the 3D nozzle to accurately reprogram and position the printed tissue model, achieving positioning control of the tissue model regeneration process.

In some embodiments, there are multiple types of the preset test functions, allowing to use flexibly different test functions to test the printing system and obtain a comprehensive preset printing control strategy, which improves real-time feedback adjustment during printing and improves printing accuracy. For example, the preset test function comprises any one or more of:

a linear-path control transfer function, a start-stop control transfer function, and a corner control transfer function.

For example, the linear-path control transfer function first defines the printing materials and a needle shape, inner diameter and materials of a printing nozzle, to determine rheological properties, storage temperature and rheological temperature of the printing materials, and the phase transition temperature (extrusion temperature) from liquid to solid; with temperature control determined, analyzing an average filament diameter and layer thickness obtained by printing different combinations of input air pressure and speed, for surface fitting to obtain a surface fitting function of the average thread diameter and layer thickness with the corresponding printing materials and the needle:

$$\begin{cases} FS = m_1 P^3 + m_2 VP^2 + m_3 V^2 P + m_4 V^3 + m_5 P^2 + m_6 VP + m_7 V^2 + m_8 P + m_9 V + m_{10} \\ LT = n_1 P^3 + n_2 VP^2 + n_3 * V^2 P + n_4 V^3 + n_5 P^2 + n_6 VP + n_7 V^2 + n_8 P + n_9 V + n_{10} \end{cases}$$

Where, the independent variable V represents speed, P represents air pressure, FS represents the filament diameter, LT represents the layer thickness, $m_1, m_2, \ldots, m_9$ represents coefficients to be solved in a FS function expression; $n_1, n_2, \ldots, n_9$ represents coefficients to be solved in a LT function expression. Based on the surface fitting function, an appropriate combination of speed and air pressure for the target filament diameter, the target layer thickness, and an acceptable error range is selected.

The start-stop control transfer function is a pre-experiment that compensates for a response delay based on an appropriate optimal combination of the input air pressure P and speed V in a linear section, and using a pre-experiment data to represent a material deposition error $\Delta R$ caused by the response delay as $t_1$ and $t_2$ related functions, represented as follows:

$$\Delta R = c_1 t_1^2 + c_2 t_1 t_2 + c_3 t_2^2 + c_4 t_1 + c_5 t_2 + c_6;$$

wherein, $c_1, c_2, \ldots, c_6$ is each coefficient to be solved in the $\Delta R$ function expression, respectively; $t_1$ represents an advanced filament discharge time; $t_2$ represents an advanced filament-broken time.

The corner control transfer function is achieved by adjusting parameters of the node position and speed near the corner in GCode by pre-experiments, including increasing nodes at a distance of $l_a$ in front of and behind the corner and at a distance of $l_a$ behind the corner, increasing the speed $\Delta V$ at the corner, using the pre-experimental data, the material deposition error $\Delta T$ at the corner is represented as a function of $l_a$ and $\Delta V$, and represented as follows:

$$\Delta T = c_7 l_a^2 + c_8 l_a \Delta V + c_9 \Delta V^2 + c_{10} l_a + c_{11} \Delta V + c_{12};$$

wherein, $c_7, c_8, \ldots, c_{12}$ is each coefficient to be solved in the $\Delta T$ function expression, respectively. The control parameter $l_a$ and $\Delta V$ that minimizes a material deposition error $\Delta T$ at the corner can be obtained by using equation.

Experiments test was performed on the a linear-path control transfer function, a start-stop control transfer function, and a corner control transfer function for different printing materials. A printing parameter library for different printing materials was established, and deep learning training was performed on the printing parameter library. A pre-constructed system control strategy for the printing system was constructed to achieve intelligent matching of printing parameters for different materials and thread diameter and layer thickness of printing requirements. The preset printing control strategy is used for adjusting printing parameters in the subsequent printing feedback control strategy and the spatiotemporal recombination control strategy.

By incorporating multiple types of preset test functions, it is possible to flexibly employ different test functions to evaluate the printing system, thereby obtaining a comprehensive preset printing control strategy. This improves real-time feedback adjustment during printing, ultimately enhancing printing accuracy.

Figure 11:
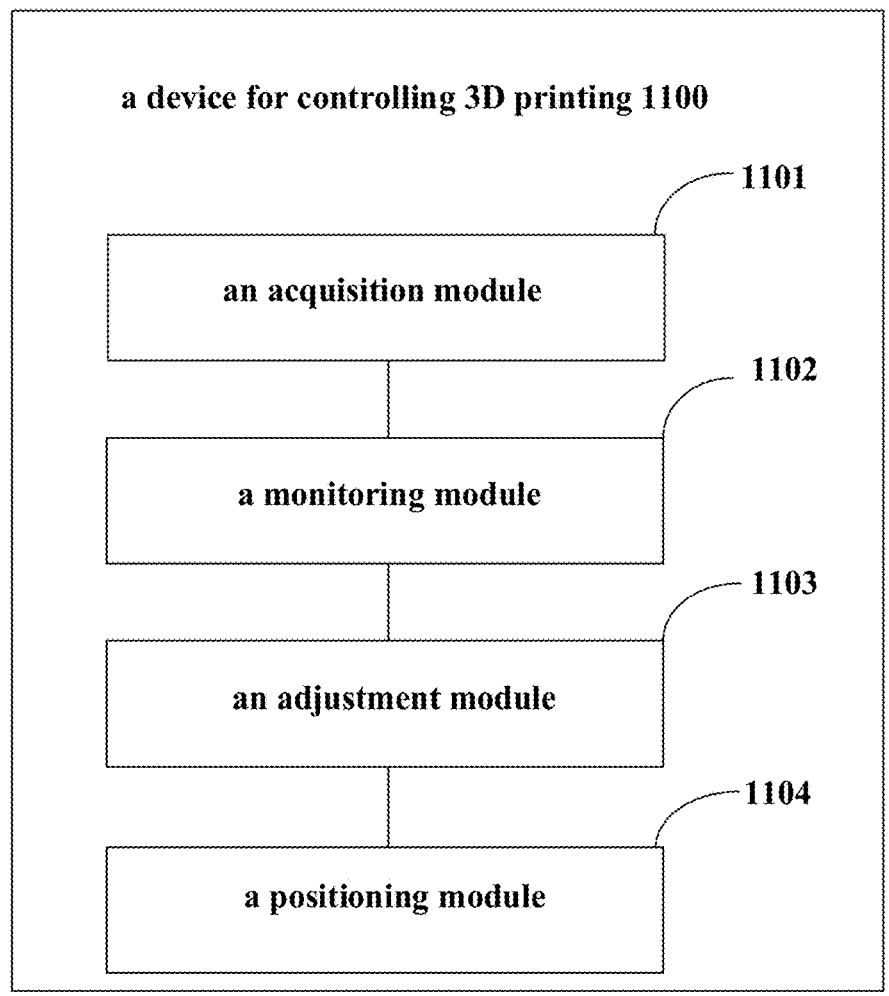
FIG. 11 is a schematic diagram of the control device for 3D printing provided in the embodiments of the present disclosure of the present disclosure.

FIG. 11 is a schematic diagram of the structure of a 3D printing device provided in the embodiments of the present disclosure. As shown in FIG. 11, the device comprises:

an acquisition module 1101, used for obtaining preset printing parameters, controlling the 3D printing device to print based on the preset printing parameters by a preset printing control strategy to obtain printing results;

a monitoring module 1102, used for monitoring a printing environment, a printing structure, and the printing results by a monitor to obtain monitoring information corresponding to the printing environment, the printing structure, and the printing results;

an adjustment module 1103, used for adjusting the preset printing parameters based on the monitoring information by a printing feedback control strategy to obtain adjusted results of the printing parameters; a positioning module 1104, used for time-programing the printing results to position printing based on the monitoring information using a spatiotemporal recombination control strategy to obtain printing results of spatiotemporal positioning control.

In some embodiments, the device further comprises:

an establishing module, used for obtaining preset printing parameters, and controlling a 3D printing device to print by a preset printing control strategy based on the preset printing parameters. Prior to obtaining the printing results, obtain multiple data to be printed and use preset testing functions to perform printing tests on multiple data to obtain multiple test results;

establishing a printing parameter library based on the multiple data to be printed and corresponding test results;

performing a deep learning training on the printing parameter library to obtain the preset printing control strategy;

wherein, the preset printing control strategy is used for adjusting the printing parameters in the printing feedback control strategy and the spatiotemporal recombination control strategy.

In some embodiments, the monitor comprises an environmental monitor and 3D imaging device, and the monitoring module 1102 is specifically used for:

monitoring the printing environment by environmental monitor to obtain environmental monitoring information corresponding to the printing environment;

monitoring the printing structure and the printing results by 3D imaging device, to obtain 3D imaging structure monitoring information corresponding to the printing process and the printing results;

obtaining the monitoring information corresponding to the printing environment, the printing structure, and the printing results based on environmental monitoring information and 3D imaging structure monitoring information.

In some embodiments, the adjustment module 1103 is specifically used for:

performing the first information processing operation on the monitoring information to obtain an imaging field size corresponding to the monitoring information;

comparing the imaging field size with the preset lateral size to obtain the first comparison result;

making a first adjustment to the preset printing parameters based on the first comparison result.

In some embodiments, the adjustment module 1103 is specifically used for:

performing the second information processing operation on the monitoring information to obtain the effective penetration depth corresponding to the monitoring information;

comparing the effective penetration depth with the preset longitudinal size to obtain the second comparison result;

making a second adjustment to the preset printing parameters based on the second comparison result.

In some embodiments, the adjustment module 1103 is specifically used for:

performing the third information processing operation on the monitoring information to obtain quantitative analysis results corresponding to the monitoring information;

comparing the quantitative analysis results with the preset threshold to obtain the third comparison result;

making a third adjustment to the preset printing parameters based on the third comparison result.

In some embodiments, the positioning module 1104 is specifically used for:

obtaining spatiotemporal recombination control instructions for monitoring information;

controlling the 3D printing device based on spatiotemporal recombination control instructions to time-program to position printing on the target position, to obtain the time-programed positioning printing result;

The spatiotemporal recombination control instructions include the target position, printing start time, printing materials selection, and printing parameter settings.

In some embodiments, the preset test function comprises any one or more of:

a linear-path control transfer function, a start-stop control transfer function, and a corner control transfer function.

The embodiments of the present disclosure provide an electronic device, specifically comprising a processor and a storage device. A computer program is stored on the storage device, and the computer program executes any of the methods described in the above embodiments when run by the processor.

Figure 12:
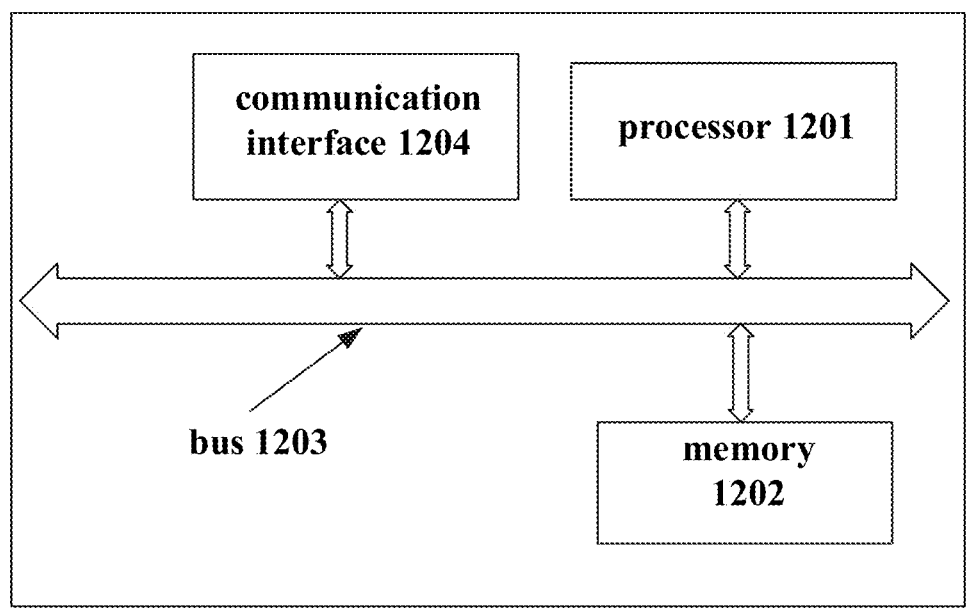
FIG. 12 is a schematic diagram of the structure of an electronic device provided in the embodiments of the present disclosure.

FIG. 12 is a schematic diagram of the structure of an electronic device provided in the embodiments of the present disclosure. The electronic device comprises: processor 1201, memory 1202, bus 1203, and communication interface 1204. The processor 1201, communication interface 1204, and memory 1202 are interconnected by bus 1203. Processor 1201 is used to execute executable modules stored in memory 1202, such as computer programs.

Memory 1202 may include high-speed random access memory (RAM), and non-volatile memory, such as at least one disk storage. The communication connection between the system network element and at least one other network element can be achieved by at least one communication interface 1204 (which can be wired or wireless), enabling communication over the Internet, wide area network, local network, metropolitan area network, etc.

Bus 1203 can be an ISA bus, PCI bus, or EISA bus, etc. The bus can be classified into address bus, data bus, control bus, etc. For ease of representation, only one bidirectional arrow is used in FIG. 12, but it does not mean that there is only one bus or one type of bus.

Memory 1202 is used to store programs, and processor 1201 executes the program after receiving execution instructions. The method executed by the flow defined device disclosed in any embodiment of the present disclosure can be applied to processor 1201 or implemented by processor 1201.

Processor 1201 may be an integrated circuit chip with signal processing capabilities. During the implementation, each step of the above method can be completed by the integrated logic circuit of the hardware in processor 1201 or software instructions. The aforementioned processor 1201 can be a general processor, including a Central Processing Unit (CPU), a Network Processor (NP), etc. It can also be a Digital Signal Processing (DSP), Application Specific Integrated Circuit (ASIC), Field Programmable Gate Array (FPGA) or other programmable logic devices, discrete gates or transistor logic devices, or discrete hardware components. The methods, steps, and logical diagrams disclosed in the embodiments of the present disclosure can be implemented or executed. A general processor can be a microprocessor or any conventional processor. The steps of the method disclosed in combination with the embodiments of the present disclosure can be directly executed by the hardware decoding processor, or by a combination of hardware and software modules in the decoding processor. Software modules can be located in the storage media of this field, such as random access memory, flash memory, read-only memory, programmable read-only memory, or electrically erasable programmable memory, registers, etc. The storage medium is located in memory 1202, and processor 1201 reads the information in memory 1202 and completes the steps of the above method in combination with its hardware.

The computer program product of the readable storage medium provided in the embodiments of the present disclosure comprises a computer-readable storage medium that stores program codes. The instructions included in the program codes can be used to execute the methods described in the above embodiments. The specific implementation can be found in the above embodiments, and will not be repeated here.

If the functions are implemented in the form of software functional units and sold or used as independent products, they can be stored in a computer-readable storage medium. Based on this understanding, the essential of the technical solution of the present disclosure, or in other words, one part which contributes to the existing technology or one part of the technical solution is reflected in the form of a software product, which is stored in a storage medium, including several instructions to enable a computer device (such as a personal computer, server, or network device, etc.) to perform all or part of the steps of the methods described in several embodiments of the present disclosure. The aforementioned storage medium includes various media that can store program code: such as USB flash disks, portable hard drives, Read Only Memory (ROM), Random Access Memory (RAM), disks or CDs, etc.

Finally, it should be noted that the above embodiments are only specific embodiments of the present disclosure, and they are used to illustrate the technical solution of the present disclosure, and not to limit it. The protection scope of the present disclosure is not limited to this. Although detailed explanations of the present disclosure have been provided with reference to the above embodiments, the skilled in the art should understand that any person familiar with the technical field within the scope of technology disclosed in the present disclosure can still modify or easily think of changes to the technical solutions described in the above embodiments, or equivalently replace some of the technical features. These modifications, changes, or replacements do not make the essence of the corresponding technical solution deviate from the spirit and scope of the technical solution in the embodiments of the present disclosure, and should be covered within the protection scope of the present disclosure. Therefore, the protection scope of the present disclosure shall be based on the scope of protection claimed in the claims.

What is claimed is:

1. A method for controlling 3D printing, comprising:
   obtaining preset printing parameters, and controlling a 3D printing device to obtain printing results based on the preset printing parameters by a preset printing control strategy;
   monitoring a printing environment, printing structure, and the printing results by a monitoring device to obtain corresponding monitoring information results of the printing environment, the printing structure, and the printing results;
   adjusting the preset printing parameters based on the monitoring information by a printing feedback control strategy to obtain adjusted results of the printing parameters;
   time-programing the printing results to achieve temporally programmed and spatially reorganized printing based on the monitoring information through a spatiotemporal recombination control strategy to obtain printing results of spatiotemporal positioning control;
   wherein, the preset printing control strategy is used for adjusting the printing parameters in the printing feedback control strategy and the spatiotemporal recombination control strategy, the preset printing control strategy comprising:
   S1: obtaining multiple data to be printed, using preset test functions to perform printing tests on the multiple data to obtain multiple test results; the data to be printed comprises a filament diameter and a layer thickness; the filament diameter and the layer thickness is quantified by obtaining a 3D structural image data of a single-layer filament by a 3D imaging device, and then quantifying based on the 3D structural image data;
   the preset test function is a control transfer function established based on rheological properties of the printing materials and measurements of a printed filament, which is the control transfer function of the filament diameter, the layer thickness, and control parameters of a printing system, including any one or more of: a linear-path control transfer function, a start-stop control transfer function, and a corner control transfer function;
   S2: establishing a printing parameter library based on the multiple data to be printed and corresponding test results;
   S3: performing a deep learning training on the printing parameter library to obtain the preset printing control strategy;
   the printing feedback control strategy is to perform multi-input multi-output iterative learning control based on the environmental parameters and 3D process structural information monitored during printing, to achieve a desired structure and structural fidelity; the structural fidelity is quantified by collecting data and reconstructing three-dimensional structures for each layer during printing, which is used for fidelity analysis of each layer and overall fidelity analysis, including:
   generating the 3D design model based on an elliptical equivalent model using interpolated GCode nodes, a target filament diameter, and a target layer thickness as a center, major axis, and minor axis of an ellipse, respectively; then, registering a 3D P-OCT reconstructed model $PT_{P\text{-}OCT}$ and a 3D design model $PT_{3D_{GCode}}$, after registration, traversing each point $PT_{3D\_GCode}(i)$ in the 3D design model and searching for a nearest point $PT_{P\text{-}OCT}(i)$ in the reconstructed model, and calculating a distance Dis ($PT_{P\text{-}OCT}(i)$, $PT_{3D\_GCode}(i)$) between the two corresponding points, determining a matching degree between the two points based on their relationship by determining the distance between the two points and matching-point distance threshold 6; determining the fidelity of the 3D printing structure based on the matching degree;

$$\text{Match}(PT_{P-OCT}(i), PT_{3D\_GCode}(i)) = \begin{cases} 1 Dis(PT_{P-OCT}(i), PT_{3D\_GCode}(i)) < \delta \\ 0 Dis(PT_{P-OCT}(i), PT_{3D\_GCode}(i)) \geq \delta \end{cases} \quad (1)$$

wherein, Match ($PT_{P\text{-}OCT}(i)$ $PT_{3D\_GCode}(i)$) represents the matching degree of the two points;

$$\text{Fidelity} = \frac{1}{N}\sum_{i=1}^{N} \text{Match}(PT_{P-OCT}(i), PT_{3D\_GCode}(i)) \quad (2)$$

wherein, N represents point cloud numbers of $PT_{3D_{GCode}}$;
the spatiotemporal recombination control strategy is to set the printing parameters through pre-constructing the preset printing control strategy obtained by the printing parameter library, customize GCode code to reposition printing of a tissue model during culturing, and perform positioning control of structures of the tissue model and function reconstruction.

2. The method of claim 1, wherein the monitor comprises an environmental monitor and a 3D imaging device; the monitoring a printing environment, a printing structure, and the printing results by a monitor to obtain a monitoring information corresponding to the printing environment, the printing structure, and the printing results comprises:
monitoring the printing environment by the environmental monitor to obtain an environmental monitoring information corresponding to the printing environment;
monitoring the printing structure and the printing results by the 3D imaging device to obtain a 3D imaging structure monitoring information corresponding to the printing process and the printing results;
obtaining the monitoring information corresponding to the printing environment, the printing structure, and the printing results based on the environmental monitoring information and the 3D imaging structure monitoring information.

3. The method of claim 1, wherein during constructing the preset printing control strategy, the filament diameter is quantified by:
A1. obtaining a 3D image data I(x,y,z) of the printed structure;
A2. performing binarization and image inversion on the 3D image data I(x,y,z), the image inversion includes setting voxels with a signal value of 1 in an original binarized image to 0, and setting voxels with a signal value of 0 in the original binarized image to 1;
A3. performing an Euclidean distance transformation on the image $I_{BW_R}(x,y,z)$ obtained after inversion in A2 to obtain $I_{ED}(x,y,z)$.

4. The method of claim 1, wherein during constructing the preset printing control strategy, the layer thickness is quantified by combining the design model generated by a GCode path and the reconstructed model obtained by scanning with the 3D imaging device, including:
B1. generating the design model using the GCode path, performing linear interpolation on GCode path nodes, and making their resolution consistent with the resolution of the 3D imaging device;
B2. generating the 3D design model based on an elliptical equivalent model using interpolated GCode nodes, a target filament diameter, and a target layer thickness as a center, major axis, and minor axis of an ellipse, registering the reconstructed model obtained from the 3D imaging device with the 3D design model generated from the GCode path;
B3. obtaining $PT_{GCode}$ of each registered GCode node and a upper surface point $PT_{S\_P\text{-}OCT}$ in the reconstructed model scanned by 3D imaging device, projecting $PT_{GCode}$ and $PT_{S\_P\text{-}OCT}$ onto a XY plane, for each point $PT_{xy\_GCode}$ (i of the GCode node after projection on the XY plane, searching for a closest matching point $PT_{xy\_S\_P\text{-}OCT}(i)$ in a XZ plane;
B4. searching for the corresponding point $PT_{S\_P\text{-}OCT}(i)$ in 3D space by utilizing coordinates of $PT_{xy\_S\_P\text{-}OCT}(i)$ in the XY plane; recording Z-coordinates of the corresponding point $PT_{S\_P\text{-}OCT}(i)$ as the layer thickness $z_{PT_{P\_OCT}}(i)$; then calculating a mean distance Mean_$\text{Dis}_{xy}$ and standard deviation $\delta$_$\text{Dis}_{xy}$ between the point $PT_{xy\_GCode}(i)$ and the matching point $PT_{xy\_S\_P\text{-}OCT}(i)$;

$$\text{Mean\_Dis}_{xy} = \|PT_{xy\_GCode}(i) - PT_{xy\_S\_P\text{-}OCT}(i)\|_2 \quad (3)$$

$$\delta\_\text{Dis}_{xy} = \sqrt{\frac{\sum_{i=1}^{N}(Dis_{xy}(i) - \text{Mean\_Dis}_{xy})^2}{N-1}} \quad (4)$$

$$\text{DIS}_{XY}(I) = \|PT_{XY\_GCODE}(I) - PT_{XY\_S\_P\text{-}OCT}(I)\|_2 \quad (5)$$

B5. using $z_{PT_{P\text{-}OCT}}(i)$ to represent the layer thickness where a distance between matching points is 3 times a mean standard deviation; the layer thickness at a distance between matching points exceeding 3 times the mean standard deviation is 0, indicating a presence of a broken filament defect;
B6. extracting the layer thickness in a XY direction and assigning pseudo-colors to display a layer thickness distribution; $LT_{(i)}=0$ indicates that the node has a broken filament defect, so a method for calculating the layer thickness can be used for detecting the broken filament defect and extracting coordinates of the broken filament;

$$LT_{(i)} = \begin{cases} z_{PT_{P-OCT}}(i), Dis_{xy}(i) < \text{Mean\_Dis}_{xy} + 3\delta\_\text{Dis}_{xy} \\ 0, Dis_{xy}(i) > \text{Mean\_Dis}_{xy} + 3\delta\_\text{Dis}_{xy} \end{cases} \quad (i)$$

wherein, $z_{PT_{P\text{-}OCT}}(i)$ represents the layer thickness where the distance between the matching points is 3 times the mean standard deviation, i represents interpolated GCode node numbers.

5. The method of claim 1, wherein during constructing the preset printing control strategy, the linear-path control transfer function first defines the printing materials and a needle shape, inner diameter and materials of a printing nozzle, to determine rheological properties, storage temperature, rheological temperature and a phase transition temperature from liquid to solid of the printing materials; with temperature control determined, analyzing an average filament diameter and layer thickness obtained by printing different combinations of input air pressure and speed, for surface fitting to obtain a surface fitting function of the average thread diameter and layer thickness with the corresponding printing materials and the needle:

$$\begin{cases} FS = m_1 P^3 + m_2 VP^2 + m_3 V^2 P + m_4 V^3 + m_5 P^2 + \\ \quad m_6 VP + m_7 V^2 + m_8 P + m_9 V + m_{10} \\ LT = n_1 P^3 + n_2 VP^2 + n_3 V^2 P + n_4 V^3 + n_5 P^2 + \\ \quad n_6 VP + n_7 V^2 + n_8 P + n_9 V + n_{10} \end{cases} \quad (7)$$

where V represents platform movement speed, P represents air pressure controlled by the printing nozzle, FS represents the filament diameter, LT represents the layer thickness, $m_1, m_2, \ldots, m_9$ represents coefficients to be solved in a FS function expression; $n_1, n_2, \ldots, n_9$ represents coefficients to be solved in a LT function expression;

selecting an appropriate combination of speed and air pressure for the target filament diameter, the target layer thickness, and an acceptable error range based on the surface fitting function;

the start-stop control transfer function is a pre-experiment that compensates for a response delay based on an appropriate optimal combination of the input air pressure P and speed V in a linear section, and using a pre-experiment data to represent a material deposition error $\Delta R$ caused by the response delay as $t_1$ and $t_2$ related functions, represented as follows:

$$\Delta R = c_1 t_1^2 + c_2 t_1 t_2 + c_3 t_2^2 + c_4 t_1 + c_5 t_2 + c_6 \quad (8)$$

wherein, $c_1, c_2, \ldots, c_6$ is each coefficient to be solved in the $\Delta R$ function expression, respectively; $t_1$ represents an advanced filament discharge time; $t_2$ represents an advanced filament-broken time;

the corner control transfer function is achieved by adjusting parameters of the node position and speed near the corner in GCode by pre-experiments, including increasing nodes at a distance of $l_a$ in front of and behind the corner and at a distance of $l_a$ behind the corner, increasing the speed $\Delta V$ at the corner, using the pre-experimental data, the material deposition error $\Delta V$ at the corner is represented as a function of $l_a$ and $\Delta V$, and represented as follows:

$$\Delta T = c_7 l_a^2 + c_8 l_a \Delta V + c_9 \Delta V^2 + c_{10} l_a + c_{11} \Delta V + c_{12} \quad (9)$$

wherein, $c_7, c_8, \ldots, c_{12}$ is each coefficient to be solved in the $\Delta T$ function expression, respectively;

the control parameter $l_a$ and $\Delta V$ that minimizes a material deposition error $\Delta T$ at the corner can be obtained by using equation (9).

6. The method of claim 1, wherein the multi-input multi-output iterative learning control comprises:

defining a difference between a preset input parameters and an actual information obtained by monitoring as an error, which is adjusted by a low-pass filter with: a rough adjustment and a fine adjustment;

defining an adjustment of a first variable with parameter changes in the printing environment having a large response delay to the printing structure as the rough adjustment of 3D printing;

obtaining a slope $m_1$ of the rough adjustment as a linear fitting slope between the thread diameter and the layer thickness with respect to the first variable;

defining an adjustment of a second variable with parameter changes in the printing environment having a fast response tracking to the printing structure as the fine adjustment of 3D printing;

obtaining a slope $m_2$ of the fine adjustment as the linear fitting slope of the second variable of the thread diameter and the layer thickness;

obtaining the transfer function g2 of the first variable and the transfer function g1 of the second variable respectively as responses exhibited by an input of the first and second variables, and accumulating results of adjusting the two variables as an error compensation output to obtain the adjusted results of the printing parameters.

7. A 3D printing device using the method of claim 1, wherein the device comprises:

an acquisition module, used for obtaining preset printing parameters, controlling the 3D printing device to print based on the preset printing parameters by a preset printing control strategy to obtain printing results;

a monitoring module, used for monitoring a printing environment, a printing structure, and the printing results by a monitor to obtain a monitoring information corresponding to the printing environment, the printing structure, and the printing results;

an adjustment module, used for adjusting the preset printing parameters based on the monitoring information by a printing feedback control strategy to obtain adjusted results of the printing parameters;

a positioning module, used for time-programing the printing results to position printing based on the monitoring information using a spatiotemporal recombination control strategy to obtain printing results of spatiotemporal positioning control.

8. An electronic device comprising a memory and a processor, wherein the memory stores a computer program which is executed on the processor, wherein when executing the computer program, the processor executes a method comprising:

obtaining preset printing parameters, and controlling a 3D printing device to print based on the preset printing parameters by a preset printing control strategy to obtain printing results;

monitoring a printing environment, a printing structure, and the printing results by a monitor to obtain a monitoring information corresponding to the printing environment, the printing structure, and the printing results;

adjusting the preset printing parameters based on the monitoring information by a printing feedback control strategy to obtain adjusted results of the printing parameters;

time-programing the printing results to position printing based on the monitoring information using a spatiotemporal recombination control strategy to obtain printing results of spatiotemporal positioning control;

wherein, the preset printing control strategy is used for adjusting the printing parameters in the printing feedback control strategy and the spatiotemporal recombination control strategy, the preset printing control strategy comprising:

S1: obtaining multiple data to be printed, using preset test functions to perform printing tests on the multiple data to obtain multiple test results; the data to be printed comprises a filament diameter and a layer thickness; the filament diameter and the layer thickness is quantified by obtaining 3D structural image data of a single-layer filament by a three-dimensional imaging device, and then quantifying based on the 3D structural image data;

the preset test function is a control transfer function established based on rheological properties of the printing materials and measurements of a printed filament, which is the control transfer function of the thread diameter, the layer thickness, and control parameters of a printing system, including any one or more of: a linear-path control transfer function, a start-stop control transfer function, and a corner control transfer function;

S2: establishing a printing parameter library based on the multiple data to be printed and corresponding test results;

S3: performing a deep learning training on the printing parameter library to obtain the preset printing control strategy;

the printing feedback control strategy is to perform multi-input multi-output iterative learning control based on the environmental parameters and three-dimensional process structural information monitored during printing, to achieve a desired structure and structural fidelity; the structural fidelity is quantified by collecting data and reconstructing three-dimensional structures for each layer during printing, which is used for fidelity analysis of each layer and overall fidelity analysis, including:

generating the 3D design model based on an elliptical equivalent model using interpolated GCode nodes, a target filament diameter, and a target layer thickness as a center, major axis, and minor axis of an ellipse, respectively; then, registering a 3D P-OCT reconstructed model $PT_{P-OCT}$ and a 3D design model $PT_{3D_{GCode}}$, after registration, traversing each point $PT_{3D}$ $G_{Code}$ (i) in the 3D design model and searching for a nearest point $PT_{P-OCT}(i)$ in the reconstructed model, and calculating a distance Dis $(PT_{P-OCT}(i), PT_{3D\_GCode}(i))$ between the two corresponding points, determining a matching degree between the two points based on their relationship by determining the distance between the two points and a matching-point distance threshold $\delta$; determining the fidelity of the 3D printing structure based on the matching degree;

$$\text{Match}(PT_{P-OCT}(i), PT_{3D\_GCode}(i)) = \begin{cases} 1 Dis(PT_{P-OCT}(i), PT_{3D\_GCode}(i)) < \delta \\ 0 Dis(PT_{P-OCT}(i), PT_{3D\_GCode}(i)) \geq \delta \end{cases} \quad (1)$$

wherein, Match $(PT_{P-OCT}(i), PT_{3D\_GCode}(i))$ represents the matching degree of the two points;

$$\text{Fidelity} = \frac{1}{N} \sum_{i=1}^{N} \text{Match}(PT_{P-OCT}(i), PT_{3D\_GCode}(i)) \quad (2)$$

wherein, N represents point cloud numbers of $PT_{3D_{GCode}}$;

the spatiotemporal recombination control strategy is to set the printing parameters through pre-constructing the preset printing control strategy obtained by the printing parameter library, customize GCode code to reposition printing of a tissue model during culturing, and perform positioning control of structures of the tissue model and function reconstruction.

\* \* \* \* \*